US012684600B2

(12) United States Patent
Ding et al.

(10) Patent No.: US 12,684,600 B2
(45) Date of Patent: Jul. 14, 2026

(54) METHOD FOR RESOURCE EXCLUSION, TERMINAL DEVICE, AND STORAGE MEDIUM

(71) Applicant: GUANGDONG OPPO MOBILE TELECOMMUNICATIONS CORP., LTD., Dongguan (CN)

(72) Inventors: Yi Ding, Dongguan (CN); Huei-Ming Lin, South Yarra (AU); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 623 days.

(21) Appl. No.: 17/813,584

(22) Filed: Jul. 19, 2022

(65) Prior Publication Data

US 2022/0350659 A1 Nov. 3, 2022

Related U.S. Application Data

(63) Continuation of application No. PCT/CN2020/107182, filed on Aug. 5, 2020.

(30) Foreign Application Priority Data

Jun. 23, 2020 (WO) ................ PCT/CN2020/097791

(51) Int. Cl.
*G06F 9/50* (2006.01)
*H04W 28/26* (2009.01)
(Continued)

(52) U.S. Cl.
CPC ........... *H04W 72/40* (2023.01); *H04W 28/26* (2013.01); *H04W 72/25* (2023.01)

(58) Field of Classification Search
CPC . G06F 9/5011; G06F 9/526; G06F 2209/5011
(Continued)

(56) References Cited

U.S. PATENT DOCUMENTS 11,589,336 B2 * 2/2023 Bharadwaj ............ H04L 5/0051
2019/0075547 A1 * 3/2019 Chae ..................... H04W 72/02
(Continued)

FOREIGN PATENT DOCUMENTS

CN 109392015 2/2019
CN 110958096 4/2020
(Continued)

OTHER PUBLICATIONS

ETSI, "Overall description of Radio Access Network (RAN) aspects for Vehicle-to-everything (V2X) based on LTE and NR (3GPP TR 37.985 version 16.0.0 Release 16)", (Jul. 2020) (Year: 2020).*
(Continued)

*Primary Examiner* — Hiren P Patel
*Assistant Examiner* — Ross Michael Vincent
(74) *Attorney, Agent, or Firm* — Hodgson Russ LLP

(57) ABSTRACT

A method for resource exclusion, a terminal device, and a storage medium are disclosed in the present disclosure. The method includes the following. Obtain a first candidate resource set by performing a first resource exclusion operation on a first resource set in a resource selection window, where the first resource set includes available resources in a resource pool used by the terminal device in the resource selection window, the first resource exclusion operation includes performing resource exclusion according to a non-sensing slot in a resource sensing window, and the non-sensing slot represents a slot in which the terminal device performs no sensing. Determine a second resource set on condition that a first percentage is smaller than X %, where the first percentage is a percentage of number of resources
(Continued)

(a)

(b)

in the first candidate resource set and number $M_{total}$ of resources in the first resource set.

20 Claims, 7 Drawing Sheets

(51) Int. Cl.
*H04W 72/25* (2023.01)
*H04W 72/40* (2023.01)

(58) Field of Classification Search
USPC ........................................................ 718/104
See application file for complete search history.

(56) References Cited

U.S. PATENT DOCUMENTS

| | | | | |
|---|---|---|---|---|
| 2021/0212117 A1* | 7/2021 | Chae | ..................... | H04W 72/02 |
| 2022/0287008 A1* | 9/2022 | Kang | .................... | H04W 72/02 |
| 2022/0377748 A1* | 11/2022 | He | ........................... | H04W 4/70 |
| 2023/0199728 A1* | 6/2023 | Yoshioka | .............. | H04W 76/14 |
| | | | | 370/329 |

FOREIGN PATENT DOCUMENTS

| | | | | | |
|---|---|---|---|---|---|
| CN | 110958586 | | 4/2020 | | |
| CN | 111182639 | | 5/2020 | | |
| CN | 111294752 | | 6/2020 | | |
| CN | 113055936 A | * | 6/2021 | ........ | H04W 28/0284 |
| CN | 119276447 A | * | 1/2025 | ........... | H04L 5/0053 |
| EP | 2840748 A1 | * | 2/2015 | ............ | H04L 41/08 |
| SG | 10202001577 T | * | 9/2021 | | |

OTHER PUBLICATIONS

"3rd Generation Partnership Project; Technical Specification Group Radio Access Network; NR; Physical layer procedures for data (Release 16)," 3GPP TS 38.214, Mar. 2020, v16.1.0.

"RAN 1 Chairman's Notes," 3GPP TSG RAN WG1 Meeting #101-e, Jun. 2020.

Oppo, "Text Proposal to Support Maximum Time Reduction in eV2X," 3GPP TSG RAN WG1 Meeting #94, R1-1808874, Aug. 2018.

"3rd Generation Partnership Project; Technical Specification Group Radio Access Network; Evolved Universal Terrestrial Radio Access (E-UTRA); Physical layer procedures (Release 16)," 3GPP TS 36.213, Mar. 2020, v16.1.0.

WIPO, International Search Report and Written Opinion for International Application No. PCT/CN2020/097791, Mar. 12, 2021.

Qualcomm Incorporated, "Sidelink Resource Allocation Mechanism for NR V2X," 3GPP TSG RAN WG1 Meeting #100-e, R1-2000963, Mar. 2020.

Qualcomm Incorporated, "Sidelink Resource Allocation Mode 2," 3GPP TSG RAN WG1 Meeting#101-e, R1-2004452, May 2020.

Oppo, "Discussion on remaining open issues in mode 2," 3GPP TSG-RAN WG1 Meeting #102-e, R1-2006004, Aug. 2020.

WIPO, International Search Report and Written Opinion for International Application No. PCT/CN2020/107182, Mar. 22, 2021.

EPO, Extended European Search Report for EP Application No. 20942076.9, Apr. 24, 2023.

CNIPA, Office Action for CN Application No. 2022108314552, Jun. 26, 2023.

EPO, Office Action for EP Application No. 20942076.9, Sep. 6, 2023.

* cited by examiner

FOREIGN PATENT DOCUMENTS

| | | | |
|---|---|---|---|
| WO | 2019084927 | | 5/2019 |
| WO | WO-2019239010 A1 | * | 12/2019 |
| WO | 2020063403 A1 | | 4/2020 |

(a)                  (b)

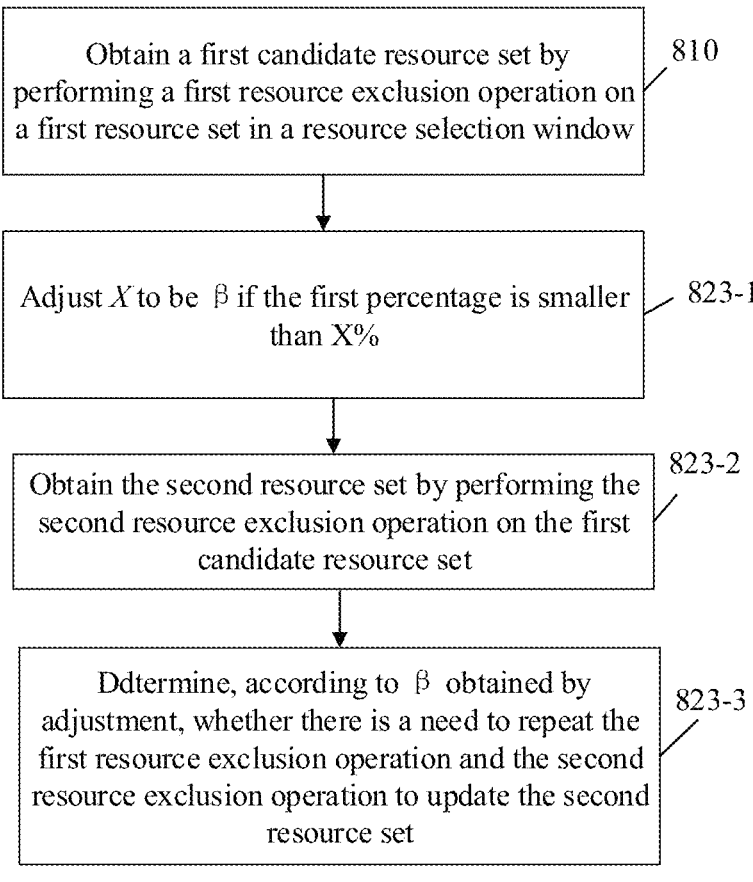

```
┌─────────────────────────────────────────┐
│  Obtain a first candidate resource set by │  810
│  performing a first resource exclusion    │
│  operation on a first resource set in a   │
│  resource selection window                │
└─────────────────────────────────────────┘
                    ↓
┌─────────────────────────────────────────┐
│  Adjust X to be  β  if the first          │  823-1
│  percentage is smaller than X%            │
└─────────────────────────────────────────┘
                    ↓
┌─────────────────────────────────────────┐
│  Obtain the second resource set by        │  823-2
│  performing the second resource exclusion │
│  operation on the first candidate         │
│  resource set                             │
└─────────────────────────────────────────┘
                    ↓
┌─────────────────────────────────────────┐
│  Ddtermine, according to  β  obtained by  │  823-3
│  adjustment, whether there is a need to   │
│  repeat the first resource exclusion      │
│  operation and the second resource        │
│  exclusion operation to update the second │
│  resource set                             │
└─────────────────────────────────────────┘
```

FIG. 11

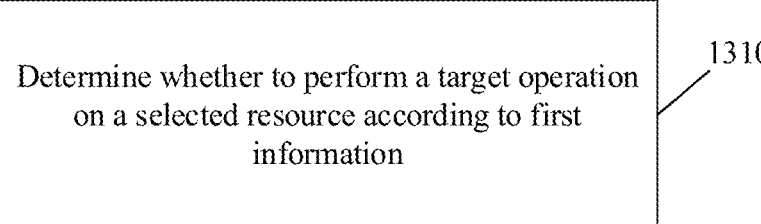

```
┌─────────────────────────────────────────┐
│  Obtain a second resource set by          │  1210
│  performing a second resource exclusion   │
│  operation on a first resource set in a   │
│  resource selection window, in the case   │
│  where a resource reservation period set  │
│  includes a value not larger than  α      │
└─────────────────────────────────────────┘
```

FIG. 12

```
┌─────────────────────────────────────────┐
│  Determine whether to perform a target    │  1310
│  operation on a selected resource         │
│  according to first information           │
└─────────────────────────────────────────┘
```

FIG. 13

METHOD FOR RESOURCE EXCLUSION, TERMINAL DEVICE, AND STORAGE MEDIUM

CROSS-REFERENCE TO RELATED APPLICATION(S)

This application is a continuation of International Application No. PCT/CN2020/107182, filed on Aug. 5, 2020, which claims priority to International Application No. PCT/CN2020/097791, filed on Jun. 23, 2020, the entire disclosures of which are incorporated herein by reference.

TECHNICAL FIELD

The present disclosure relates to the field of mobile communication, and more particularly to a method for resource exclusion, a terminal device, and a storage medium.

BACKGROUND

In order to realize direct communication between terminal devices in a vehicle to everything (V2X) system, a sidelink (SL) transmission mode is introduced.

In an SL transmission mode, the terminal device needs to select resources in a resource pool. The terminal device determines a resource selection window and a resource sensing window, and according to a sensing result of the resource sensing window, the terminal device performs an exclusion operation on resources in the resource selection window to obtain candidate resources for to-be-transmitted data.

However, according to the above technology, an infinite loop may occur if too many resources in the resource selection window are excluded.

SUMMARY

Implementations of the present disclosure provide a method for resource exclusion, a terminal device, and a storage medium.

According to an aspect of the present disclosure, a method for resource exclusion is provided. The method is applied to a terminal device and includes the following. Obtain a first candidate resource set by performing a first resource exclusion operation on a first resource set in a resource selection window, where the first resource set includes available resources in a resource pool used by the terminal device in the resource selection window, the first resource exclusion operation includes performing resource exclusion according to a non-sensing slot in a resource sensing window, and the non-sensing slot represents a slot in which the terminal device performs no sensing. Determine a second resource set on condition that a first percentage is smaller than X %, where the first percentage is a percentage of number of resources in the first candidate resource set and number $M_{total}$ of resources in the first resource set.

According to an aspect, a terminal device is provided. The terminal device includes a processor and a memory storing a computer program. The computer program is executed by the processor to cause the terminal device to obtain a first candidate resource set by performing a first resource exclusion operation on a first resource set in a resource selection window, where the first resource set includes available resources in a resource pool used by the terminal device in the resource selection window, the first resource exclusion operation includes performing resource exclusion according to a non-sensing slot in a resource sensing window, and the non-sensing slot represents a slot in which the terminal device performs no sensing. The computer program is further executed by the processor to cause the terminal device to determine a second resource set on condition that a first percentage is smaller than X %, where the first percentage is a percentage of number of resources in the first candidate resource set and number $M_{total}$ of resources in the first resource set.

According to an aspect, a non-transitory computer-readable storage medium is provided. The storage medium is configured to store a computer program. The computer program is executed by a processor of a terminal device to cause the terminal device to perform the following. Obtain a first candidate resource set by performing a first resource exclusion operation on a first resource set in a resource selection window, where the first resource set includes available resources in a resource pool used by the terminal device in the resource selection window, the first resource exclusion operation includes performing resource exclusion according to a non-sensing slot in a resource sensing window, and the non-sensing slot represents a slot in which the terminal device performs no sensing. Determine a second resource set on condition that a first percentage is smaller than X %, where the first percentage is a percentage of number of resources in the first candidate resource set and number $M_{total}$ of resources in the first resource set.

BRIEF DESCRIPTION OF THE DRAWINGS

In order to illustrate technical solutions in implementations of the present disclosure more clearly, the following will briefly illustrate accompanying drawings used for illustrating the implementations. Obviously, the accompanying drawings used in the following illustration are only some implementations of the present disclosure. For those of ordinary skill in the art, other accompanying drawings can also be obtained from these accompanying drawings without creative effort.

FIG. 11 is a flow chart illustrating a method for resource exclusion provided in an exemplary implementation of the present disclosure.

FIG. 12 is a flow chart illustrating a method for resource exclusion provided in an exemplary implementation of the present disclosure.

FIG. 13 is a flow chart illustrating a method for resource processing provided in an exemplary implementation of the present disclosure.

DETAILED DESCRIPTION

In order to make objectives, technical solutions, and advantages of the present disclosure clearer, implementations of the present disclosure will be further illustrated in detail below with reference to the accompanying drawings.

First, nouns involved in the implementations of the present disclosure will be briefly illustrated.

Vehicle to everything (V2X): V2X is the key technology for a future intelligent transportation system. V2X mainly studies a 3rd generation partnership project (3GPP) communication protocol-based vehicle data transmission scheme. V2X communication includes V2V communication, vehicle to infrastructure (V2I) communication, and vehicle to people (V2P) communication. Application of V2X can improve driving safety, reduce congestion and energy consumption of vehicles, improve traffic efficiency, and so on.

Figure 1:
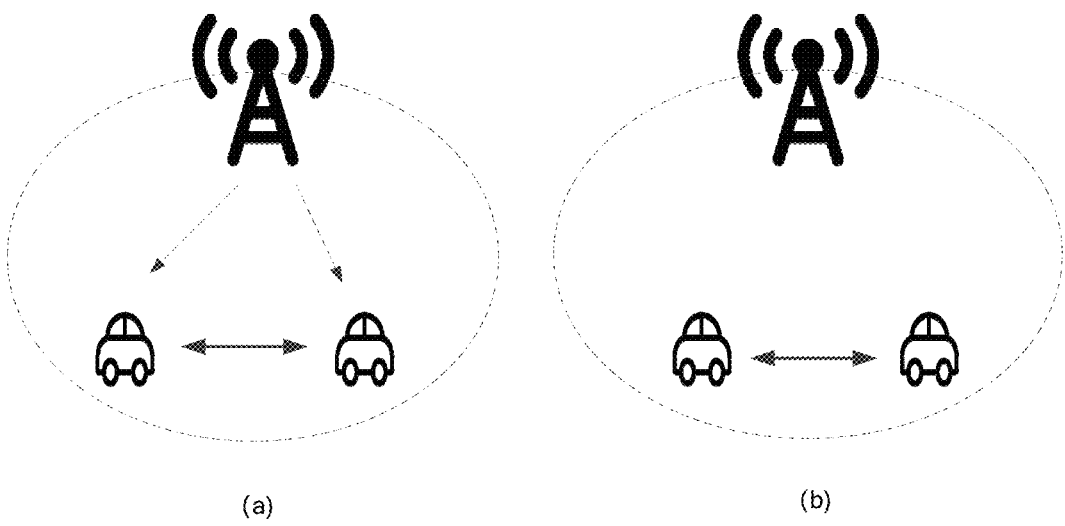
FIG. 1 is a schematic diagram illustrating a sidelink (SL) transmission mode in related art according to the present disclosure.

Sidelink (SL) transmission: SL transmission is a device-to-device (D2D) communication mode with a relatively high spectral efficiency and a relatively low transmission latency. Two SL transmission modes are defined in 3GPP: mode A and mode B. As illustrated in (a) of FIG. 1, in mode A, resources used by a terminal device during transmission are assigned by a base station through a downlink (DL), and the terminal device transmits data on an SL according to the resources assigned by the base station. The base station can assign resources for a single transmission to the terminal device, or can assign resources for semi-static transmission to the terminal device. As illustrated in (b) of FIG. 1, in mode B, the terminal device autonomously selects one or more resources in a resource pool to transmit data. Specifically, the terminal device may select transmission resources in the resource pool through sensing, or the terminal device may randomly select transmission resources in the resource pool.

In new radio (NR)-V2X, autonomous driving needs to be supported, so higher requirements are put forward for data interaction between vehicles, such as a higher throughput, a lower latency, higher reliability, larger coverage, more flexible resource allocation, etc.

Figure 2:
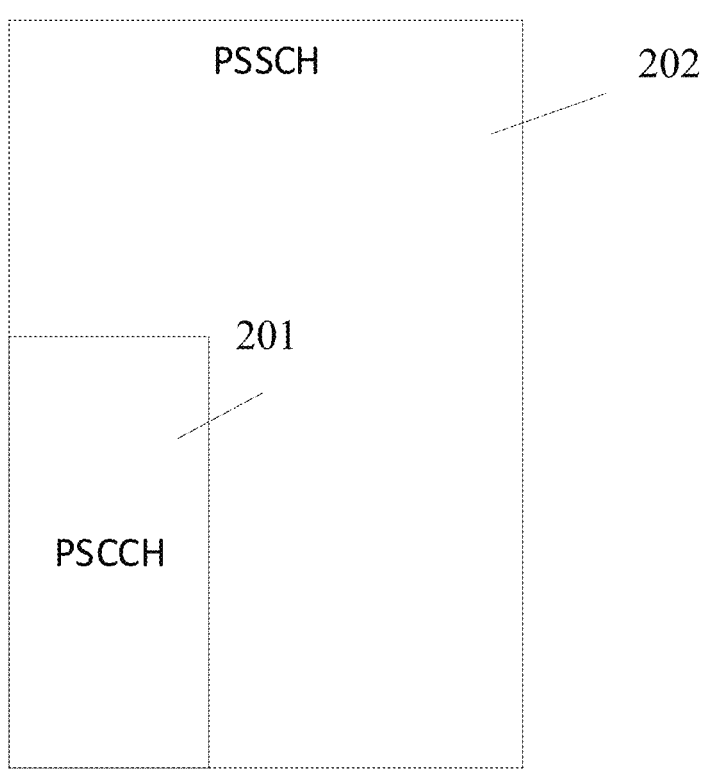
FIG. 2 is a block diagram illustrating a physical layer structure of new radio (NR)-vehicle to everything (V2X) in related art according to the present disclosure.

A physical layer structure of NR-V2X is illustrated in FIG. 2. A physical sidelink control channel (PSCCH) 201 used to transmit control information is contained in a physical sidelink shared Channel (PSSCH) 202 used to transmit data, which also means that the PSCCH 201 and the PSSCH 202 need to be transmitted at the same time. Therefore, in 3GPP standard, only support that for initial transmission of a current transport block (TB) resources for retransmission of the current TB are reserved, for retransmission of the current TB resources for retransmission of the current TB are reserved, and for initial transmission or retransmission of a previous TB resources for initial transmission or retransmission of the current TB are reserved.

Figure 3:
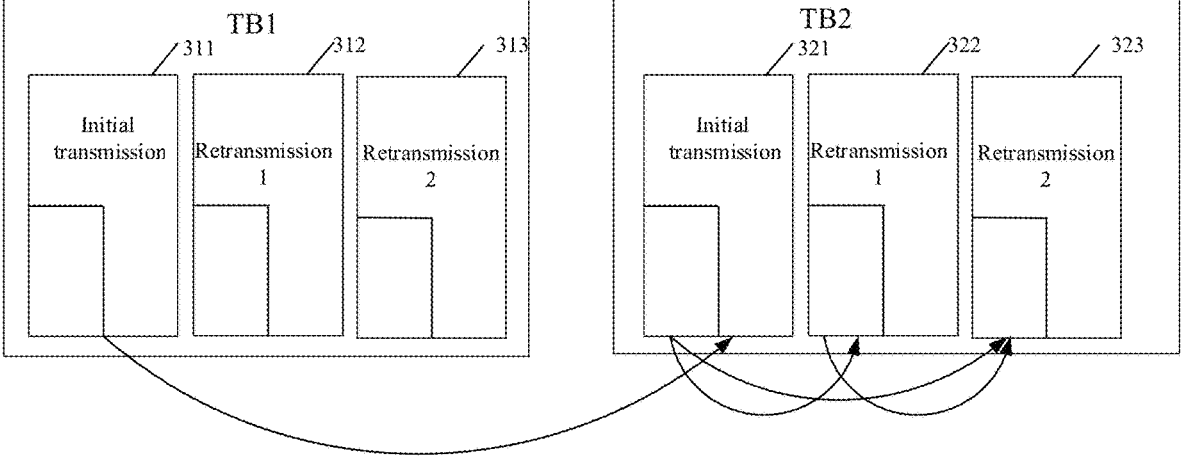
FIG. 3 is a block diagram illustrating resource reservation in a transport block (TB) or between TBs in related art according to the present disclosure.

As illustrated in FIG. 3, for initial transmission of TB 2 resources for retransmission 1 and retransmission 2 of TB 2 are reserved, and for retransmission 1 of TB 2 resources for retransmission 2 of TB 2 are reserved. Resource reservation in a same TB is indicated by two fields in first SL control information transmitted through a PSCCH: a time resource assignment field and a frequency resource assignment field. Assuming that user equipment (UE) 1 senses initial transmission of TB 2 transmitted by UE 2, UE 1 decodes two fields, i.e., time resource assignment field and frequency resource assignment field, in first SL control information in a PSCCH initially transmitted, and then can determine time-frequency resource locations reserved by UE 2 for transmitting retransmission 1 and retransmission 2 of TB 2. When UE 1 performs resource selection, UE 1 can exclude resources reserved by UE 2 for transmitting retransmission 1 and retransmission 2 of TB 2 to avoid resource collision with UE 2.

Meanwhile, in addition to resource reservation in the same TB, NR V2X also supports resource reservation between two TBs. For example, in FIG. 3, for initial transmission of TB 1 resources for initial transmission of TB 2 are reserved, for retransmission 1 of TB 1 resources for retransmission 1 of TB 2 are reserved, and for retransmission 2 of TB 1 resources for retransmission 2 of TB 2 are reserved. Resource reservation between TBs is indicated by a resource reservation period field in first SL control information transmitted through a PSCCH. Assuming that UE 1 senses initial transmission of TB 1 transmitted by UE 2, UE 1 determines through decoding a resource reservation period indicated by a resource reservation period field in first SL control information in a PSCCH initially transmitted, and can determine a time domain location reserved by UE 2 for transmitting initial transmission of TB 2 by adding the resource reservation period and a time domain location for sensed initial transmission of TB 1 transmitted by UE 2. A frequency domain location for initial transmission of TB 2 is the same as that for initial transmission of TB 1, so UE 1 can determine a time-frequency resource location reserved by UE 2 for transmitting initial transmission of TB 2. UE 1 can also exclude resources reserved by UE 2 for transmitting initial transmission of TB 2 to avoid resource collision with UE 2.

In addition, since first SL control information in a PSCCH at initial transmission of TB 1, first SL control information in a PSCCH at retransmission 1 of TB 1, and first SL control information in a PSCCH at retransmission 2 of TB 1 have a same resource reservation period field, as illustrated in FIG. 3, a time domain interval between initial transmission of TB 1 and initial transmission of TB 2, a time domain interval between retransmission 1 of TB 1 and retransmission 1 of TB 2, and a time domain interval between retransmission 2 of TB 1 and retransmission 2 of TB 2 are the same. Therefore, assuming that UE 1 senses initial transmission of TB 1 transmitted by UE 2, time-frequency resource locations for retransmission 1 and retransmission 2 of TB 1 and initial transmission of TB 2 reserved by UE 2 can be determined by decoding the PSCCH. Meanwhile, since resource reservation intervals between TBs are the same, UE 1 can also calculate time-frequency resource locations for retransmission 1 and retransmission 2 of TB 2 reserved by UE 2. UE 1 can exclude corresponding resources to avoid resource collision with UE 2.

To sum up, when UE 1 works in mode B, UE 1 can obtain, by sensing PSCCHs transmitted by other UEs, first SL control information transmitted by other UEs, so as to determine resources reserved by the other UEs. When UE 1 performs resource selection, UE 1 can exclude resources reserved by the other UEs to avoid resource collision.

Configuration of a resource pool used by UE 2 includes a (pre-configured) configured resource reservation period set M, and UE 2 selects a resource reservation period from set M and puts the resource reservation period selected into a resource reservation period field in first SL control information of UE 2, so as to perform resource reservation between two TBs. In NR-V2X, possible values of the resource reservation period may be 0, [1, 99], 100, 200, 300, 400, 500, 600, 700, 800, 900, or 1000 milliseconds, and resource reservation period set M in the configuration of the resource pool is formed by e values in the above possible values. Illustratively, e is equal to 16.

A resource selection method in NR-V2X is as follows.

Figure 4:
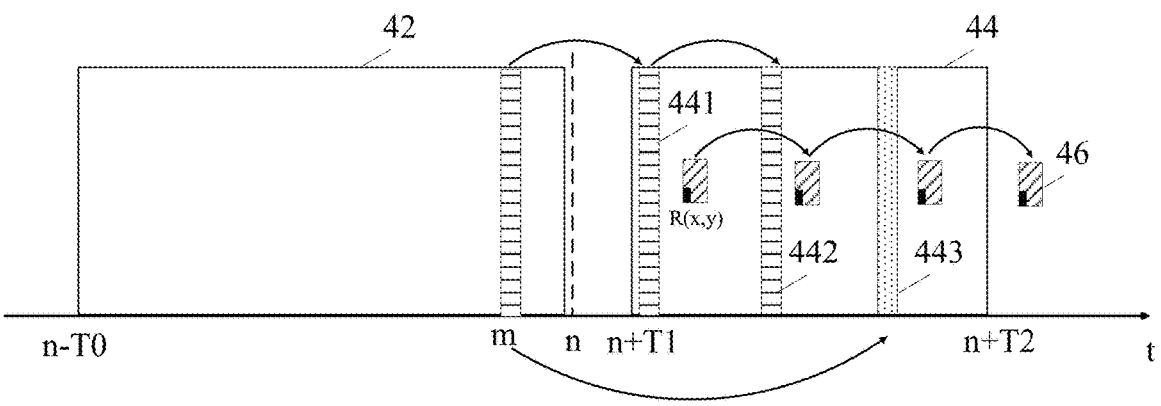
FIG. 4 is a schematic diagram illustrating a method for resource selection provided in an exemplary implementation of the present disclosure.
Figure 5:
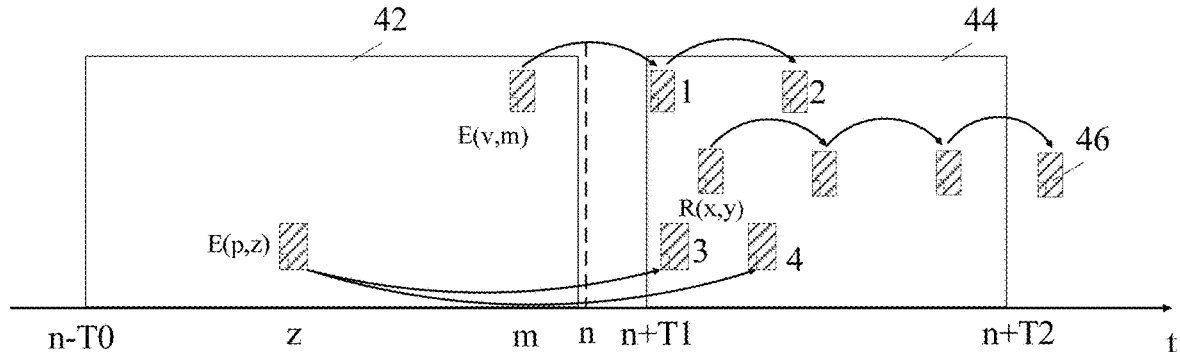
FIG. 5 is a schematic diagram illustrating a method for resource selection provided in an exemplary implementation of the present disclosure.

As illustrated in FIG. 4 and FIG. 5, a resource selection window starts from time n+T1 and ends at time n+T2.

$0 <= T1 <= T_{proc,1}$, $T_{proc,1}$ is the time for UE1 to perform resource selection and prepare data. When a subcarrier spacing is 15, 30, 60, or 120 kHz, $T_{proc,1}$ is 3, 5, 9, or 17 time slots; $T2_{min} <= T2 <=$ service latency requirement range. A value of $T2_{min}$ is $\{1, 5, 10, 20\}*2^{\mu}$ time slots, where $\mu$=0, 1, 2, or 3 respectively corresponding to the subcarrier spacing of 15 kHz, 30 kHz, 60 kHz, or 120 kHz. UE 1 determines $T2_{min}$ from the value set according to a priority of data to be transmitted by UE 1. When $T2_{min}$ is greater than the service latency requirement range, what is needed is that T2=the service latency requirement range.

The terminal device performs resource sensing from time n-T0 to time $n-T_{proc,o}$, and a value of T0 is 100 or 1100 milliseconds. $T_{proc,0}$ is the time for the terminal device to decode control information. When the subcarrier spacing is 15, 30, 60, or 120 kHz, $T_{proc,0}$ represents 1, 1, 2, or 4 time slots, respectively.

Step 1, Resource Exclusion Process

When a service data packet arrives at time n, UE 1 needs to perform resource selection. UE1 regards all available resources in a resource pool used by UE 1 in a resource selection window 44 as candidate resource set A, and any resource in candidate resource set A is denoted as R(x, y), where x indicates a frequency domain location of the resource, and y indicates a time domain location of the resource. The number of all available resources in the resource pool used by UE 1 in the resource selection window 44 is denoted as $M_{total}$.

Step 1-1: in case 1 as illustrated in FIG. 4, if UE 1 transmits data and does not perform sensing in time slot m in a resource sensing window, UE1 determines whether time slot m+q*Prxlg and resource R(x, y+j*Ptxlg) overlap (fully or partially overlap). "time slot m+q*Prxlg" represents a resource set that may be reserved by UE 2, and UE 2 is another terminal device relative to UE 1. "resource R(x, y+j*Ptxlg)" represents a resource set that UE1 may use (select or reserve). If the two resource sets overlap, UE 1 excludes resource R(x, y) from candidate resource set A.

For resource R(x, y+j*Ptxlg), j=0, 1, 2, 3 . . . , C−1. C is determined by a random counter value generated by UE 1. When UE 1 performs resource selection, UE 1 may generate a random counter value (a positive integer) to determine to reserve how many periods for resources to be selected. Ptxlg represents the number of logical time slots converted from Ptx, and Ptx represents a resource reservation period determined by UE 1, which is one value in resource reservation period set M in resource pool configuration used by UE 1, and is also a value indicated by a resource reservation period field in first SL control information transmitted when UE 1 transmits data. Therefore, resource R(x, y+j*Ptxlg) represents four resources 46 each marked with a shadow indicated by oblique lines in FIG. 4.

For time slot m+q*Prxlg, q=1, 2, 3 . . . , Q, and Prxlg represents the number of logical time slots converted from Prx. Generally, Prx represents a resource reservation period indicated by a resource reservation period field in first SL control information (transmitted by UE 2) transmitted through a PSCCH that is sensed by UE 1. However, since UE 1 does not perform sensing in time slot m, Prx represents any possible value in resource reservation period set M in the resource pool configuration used by UE 1, that is, UE 1 may determine whether time slot m+q*Prxlg calculated according to each value in set M overlaps resource R(x, y+j*Ptxlg).

For Q, if Prx<Tscal and n−m<=Prxlg, then Q=[Tscal/Prx] (representing round up); otherwise, Q=1. Tscal=T2. For example, UE 1 selects Prx from resource reservation period set M in the resource pool configuration used by UE 1. If Prx<Tscal and n−m<=Prxlg, Q=2, then time slot m+q*Prxlg represents two time slots 441 and 442 next to time slot m and marked by shadows indicated by horizontal lines as illustrated in FIG. 4; otherwise, Q=1, and time slot m+q*Prxlg represents a time slot 443 marked by a shadow indicated by dots in FIG. 4.

Step 1-2: in case 2 as illustrated in FIG. 5, if UE 1 senses a PSCCH on resource E(v, m) in time slot m in a resource sensing window, UE 1 measures reference signal receiving power (RSRP) of the PSCCH or RSRP of a PSSCH scheduled by the PSCCH (i.e., the RSRP of the PSSCH transmitted together with the PSCCH), where v represents a frequency domain location of resource E(v, m). If the measured RSRP is greater than an SL-RSRP threshold, and UE 1 determines that resource E(v, m+q*Prxlg) overlaps with resource R(x, y+j*Ptxlg) (fully or partially overlap), UE 1 excludes corresponding resource R(x, y) from set A.

For resource R(x, y+j*Ptxlg), j=0, 1, 2, 3 . . . , C−1. C is determined by a random counter value generated by UE 1. When UE 1 performs resource selection, UE 1 may generate a random counter value to determine to reserve how many periods for resources to be selected. Ptxlg represents the number of logical time slots converted from Ptx, and Ptx represents a resource reservation period determined by UE 1. Resource R(x, y+j*Ptxlg) represents four resources 46 marked with shadows indicated by oblique lines in FIG. 5.

For time slot m+q*Prxlg, q=1, 2, 3 . . . , Q, Prxlg represents the number of logical time slots converted from Prx. Prx represents a resource reservation period indicated by a resource reservation period field in first SL control information transmitted through a PSCCH that is sensed by UE 1. For Q, if Prx<Tscal and n−m<=Prxlg, Q=[Tscal/Prx] (representing round up), otherwise Q=1. For example, as illustrated in FIG. 5, if UE 1 senses the PSCCH on resource E(v, m) in time slot m, and determines, by decoding, that Prx<Tscal and n-m<=Prxlg, UE 1 calculates that Q=2. Then resource E(v, m+q*Prxlg) represents resource 1 and resource 2 in FIG. 5.

Meanwhile, UE 1 also performs resource exclusion according to a time resource assignment field and a frequency resource assignment field in first SL control information transmitted through the PSCCH sensed. For example, as illustrated in FIG. 5, UE 1 senses a PSCCH on resource E(p, z), and measures RSRP of the PSCCH or RSRP of a PSSCH scheduled by the PSCCH. If the measured RSRP is higher than an SL-RSRP threshold, and the PSCCH sensed by UE 1 on resource E(p, z) uses a time resource assignment field and a frequency resource assignment field to indicate that resource 3 and resource 4 are reserved, UE 1 excludes corresponding resources in a resource selection window.

To sum up, at step 1-2, according to a resource reservation period field, a time resource assignment field, and a frequency resource assignment field in first SL control information sensed by UE 1, UE 1 excludes time-frequency resources reserved through the first SL control information.

If the number of remaining resources in candidate resource set A is less than $M_{total}*X$ %, then increase the SL-RSRP threshold by 3 dB, and repeat step 1 (including step 1-1 and step 1-2).

Step 2, Resource Selection Process

After performing resource exclusion, UE 1 selects several resources in candidate resource set A and determines the resources selected as resources used for initial transmission and retransmission.

What needs to be illustrated is as follows.

1. The RSRP threshold is determined by priority P1 carried in a PSCCH sensed by UE 1 and priority P2 of data to be transmitted by UE 1. UE 1 obtains an SL-RSPR threshold table according to network configuration or pre-configuration, where the SL-RSRP threshold table contains SL-RSRP thresholds corresponding to all priority combinations.

For example, as illustrated in Table 1, assuming that optional values of priority P1 and priority P2 are 0-7, an SL-RSRP threshold corresponding to different priority combinations is represented by $\gamma_{ij}$, where i in $\gamma_{ij}$ represents a value of priority P1, and j represents a value of priority P2.

TABLE 1

| P2 | P1 | | | | | | | |
|---|---|---|---|---|---|---|---|---|
| | 0 | 1 | 2 | 3 | 4 | 5 | 6 | 7 |
| 0 | $\gamma_{00}$ | $\gamma_{01}$ | $\gamma_{02}$ | $\gamma_{03}$ | $\gamma_{04}$ | $\gamma_{05}$ | $\gamma_{06}$ | $\gamma_{07}$ |
| 1 | $\gamma_{10}$ | $\gamma_{11}$ | $\gamma_{12}$ | $\gamma_{13}$ | $\gamma_{14}$ | $\gamma_{15}$ | $\gamma_{16}$ | $\gamma_{17}$ |
| 2 | $\gamma_{20}$ | $\gamma_{21}$ | $\gamma_{22}$ | $\gamma_{23}$ | $\gamma_{24}$ | $\gamma_{25}$ | $\gamma_{26}$ | $\gamma_{27}$ |
| 3 | $\gamma_{30}$ | $\gamma_{31}$ | $\gamma_{32}$ | $\gamma_{33}$ | $\gamma_{34}$ | $\gamma_{35}$ | $\gamma_{36}$ | $\gamma_{37}$ |
| 4 | $\gamma_{40}$ | $\gamma_{41}$ | $\gamma_{42}$ | $\gamma_{43}$ | $\gamma_{44}$ | $\gamma_{45}$ | $\gamma_{46}$ | $\gamma_{47}$ |
| 5 | $\gamma_{50}$ | $\gamma_{51}$ | $\gamma_{52}$ | $\gamma_{53}$ | $\gamma_{54}$ | $\gamma_{55}$ | $\gamma_{56}$ | $\gamma_{57}$ |
| 6 | $\gamma_{60}$ | $\gamma_{61}$ | $\gamma_{62}$ | $\gamma_{63}$ | $\gamma_{64}$ | $\gamma_{65}$ | $\gamma_{66}$ | $\gamma_{67}$ |
| 7 | $\gamma_{70}$ | $\gamma_{71}$ | $\gamma_{72}$ | $\gamma_{73}$ | $\gamma_{74}$ | $\gamma_{75}$ | $\gamma_{76}$ | $\gamma_{77}$ |

When UE 1 senses a PSCCH transmitted by UE 2, UE 1 obtains priority P1 carried in first SL control information transmitted through the PSCCH and priority P2 of a data packet to be transmitted, and determines an SL-RSRP threshold by looking up Table 1.

2. Whether UE 1 uses a measured RSRP of the PSCCH or a measured RSRP of a PSSCH scheduled by the PSCCH to compare with the SL-RSRP threshold depends on the configuration of the resource pool used by UE1. The configuration of the resource pool may be configured by network or pre-configured.

3. Regarding that Prxlg/Ptxlg represent the number of logical time slots converted from Prx/Ptx respectively: assuming that a time slot is equal to 1 millisecond and Prx represents 5 milliseconds, among these 5 time slots, 2 time slots may be DL time slots or time slots for transmitting synchronization signals in a time-division duplex (TDD) mode, and these time slots are not included in a resource pool for SL, so it is necessary to convert 5 milliseconds represented by Prx into 3 logical time slots, namely Prxlg.

4. For X %, possible values of X include {20, 35, 50}. The configuration of the resource pool used by UE 1 contains a correspondence between priorities and the above possible values, and UE 1 determines the value of X according to a priority of to-be-transmitted data and the correspondence. The configuration of the resource pool can be either configured by network or pre-configured.

Re-evaluation and resource preemption mechanisms are as follows.

In addition, NR-V2X also supports reselection of a resource that has been selected but is not indicated by transmitting first SL control information after resource selection is completed.

Figure 6:
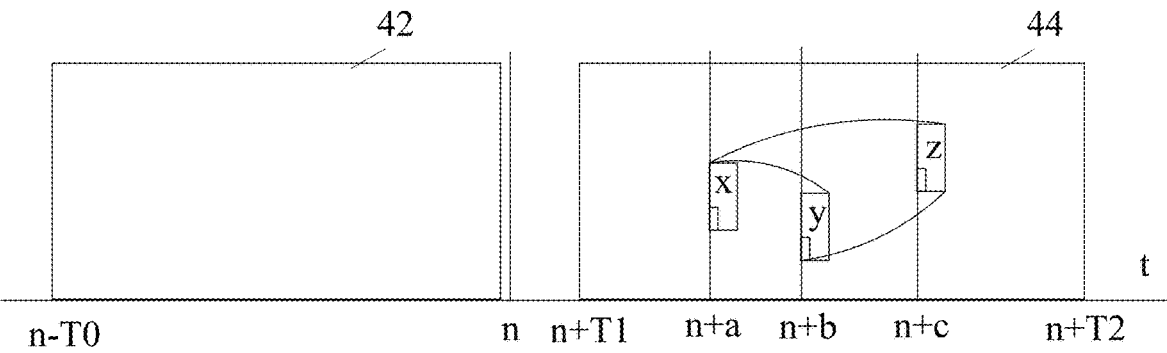
FIG. 6 is a schematic diagram illustrating a method for resource selection provided in an exemplary implementation of the present disclosure.

As illustrated in FIG. 6, the terminal device generates data in time slot n, determines a resource sensing window and a resource selection window for resource selection, and the terminal device selects resource x for initial transmission in time slot n+a, resource y for retransmission in time n+b, and resource z for retransmission in time slot n+c. First SL control information transmitted through resource x indicates resource x, resource y, and resource z, and first SL control information transmitted through resource y indicates resource y and resource z. The terminal device consecutively performs PSCCH sensing after time slot n. To transmit selected resources x, y, and z that are indicated by first SL control information for the first time in time slot n+a, the terminal device performs the resource exclusion process at step 1 at least once in time slot n+a−T3. After the resource exclusion, if resources x, y, and z are still in resource set A subject to the resource exclusion, there is no need to perform resource reselection. Otherwise, for that resources x, y, and z are not included in resource set A subject to the resource exclusion, the terminal device performs resource reselection (triggering the resource reselection at step 2), or performs resource reselection for any one or more of resources x, y, and z resources. $T3=T_{proc,1}$.

In NR-V2X, resource preemption is also supported. In a process of determining whether selected resources are preempted by other terminal devices, the terminal device may trigger the resource exclusion process.

Exemplarily, in FIG. 6, the terminal device selects resources x, y, and z in time slot n. The first SL control information transmitted through resource x indicates resource x, resource y, and resource z, and the first SL control information transmitted through resource y indicates resource y and resource z. After time slot n, the terminal device consecutively performs PSCCH sensing. To transmit resources y and z that are indicated by the first SL control information and have been indicated by first SL control information previously transmitted by the terminal device in time slot n+b, the terminal device performs the resource exclusion process at step 1 one time at least in time slot n+b−T3. If resources y and z are still in resource set A subject to the resource exclusion, resource reselection is not required. Otherwise, further determine whether the case that resource y or z is not in resource set A subject to the resource exclusion is caused by indication of first SL control information carrying a high priority, if so, the terminal device performs the reselection operation at step 2 for resource y or z. $T3=T_{proc,1}$. $T_{proc,1}$ includes the time for the terminal device to perform resource selection or reselection. Optionally, when performing resource reselection for preempted resources, the terminal device can reselect any resource that is not indicated by transmitting first SL control information.

Optionally, according to network configuration or pre-configuration, the resource preemption mechanism can be activated or deactivated in units of resource pools.

Optionally, the terminal device can activate or deactivate resource preemption according to a measured channel occupancy ratio (CR) or channel busy ratio (CBR). For example, if the CBR is relatively low, resource preemption is deactivated; if the CBR is relatively high, resource preemption is activated.

If a priority of a data packet to be transmitted by the terminal device is the highest priority or higher than priority threshold φ, the terminal device does not consecutively perform resource sensing on whether selected resources are preempted by other terminal devices after completing the resource selection.

For example, in FIG. 6, the terminal device selects resources x, y, and z in time slot n. The first SL control information transmitted through resource x indicates resource x, resource y, and resource z, and the first SL control information transmitted through resource y indicates resource y and resource z. If the priority of the data packet to be transmitted by the terminal device is the highest priority or higher than priority threshold φ, after time slot n, the terminal device does not consecutively perform resource sensing on whether selected resources x, y, and z are preempted by other terminal devices, also does not determine whether resources x, y, and z are preempted by other terminal devices, and does not trigger a resource exclusion process on resources x, y, and z during the process of determining resource preemption.

Optionally, if a higher layer (medium access control (MAC) layer or radio link control (RLC) layer) configures a series of resources for a physical layer, the physical layer determines whether these resources are preempted by other terminal devices. If the priority of the data packet to be transmitted by the terminal device is the highest priority or higher than priority threshold φ, the physical layer does not perform on these resources the resource exclusion process at step 1, and does not determine whether these resources are preempted by other terminal devices. The physical layer reports an empty set to the higher layer, which means that the series of resources are not preempted by other terminal devices, or the physical layer does not report to the higher layer about the series of resources.

If the priority of the data packet to be transmitted by the terminal device is the highest priority or higher than priority threshold φ, the terminal device does not determine whether selected resources are preempted by other terminal devices after completing the resource selection, and does not trigger the corresponding resource exclusion.

For example, in FIG. 6, the terminal device selects resources x, y, and z in time slot n. The first SL control information transmitted through resource x indicates resource x, resource y, and resource z, and the first SL control information transmitted through resource y indicates resource y and resource z. If the priority of the data packet to be transmitted by the terminal device is the highest priority or higher than priority threshold φ, after time slot n, the terminal device does not determine whether resources x, y, and z are preempted by other terminal devices, and does not trigger the resource exclusion process on resources x, y, and z in the process of determining resource preemption.

If the terminal device is about to complete indication of all resources in time slot r, after time slot r-T3 or time slot r, if the priority of the data packet to be transmitted by the terminal device is the highest priority or higher than priority threshold φ, the terminal device does not consecutively perform resource sensing on selected resources.

For example, in FIG. 6, the terminal device selects resources x, y, and z in time slot n. The first SL control information transmitted through resource x indicates resource x, resource y, and resource z, and the first SL control information transmitted through resource y indicates resource y and resource z. If the terminal device transmits the first SL control information on resource x, all time-frequency resources selected by the terminal device are indicated. A time slot where resource x is located is denoted as time slot r. After time slot r-T3 or time slot r, if the priority of the data packet to be transmitted by the terminal device is the highest priority or higher than priority threshold gyp, the terminal device does not consecutively perform resource sensing on selected resources (including resource sensing on whether to perform resource reselection for the selected resources and/or whether the selected resources are preempted by other terminal devices mentioned above). $T3=T_{proc,1}$. $T_{proc,1}$ includes the time for the terminal device to perform resource selection or reselection.

If the terminal device is about to complete indication of all resources in time slot r, after time slot r-T3 or time slot r, if the priority of the data packet to be transmitted by the terminal device is the highest priority or higher than priority threshold φ, the terminal device does not determine whether the selected resources are preempted by other terminal devices, and does not trigger corresponding resource exclusion.

For example, in FIG. 6, the terminal device selects resources x, y, and z in time slot n. The first SL control information transmitted through resource x indicates resource x, resource y, and resource z, and the first SL control information transmitted through resource y indicates resource y and resource z. If the terminal device transmits the first SL control information on resource x, all time-frequency resources selected by the terminal device are indicated. A time slot where resource x is located is denoted as time slot r. After time slot r-T3 or time slot r, if the priority of the data packet to be transmitted by the terminal device is the highest priority or higher than priority threshold gyp, the terminal device does not determine whether resources y and z are preempted by other terminal devices, and does not trigger the resource exclusion process on resources y and z during the process of determining resource preemption. $T3=T_{proc,1}$. $T_{proc,1}$ includes the time for the terminal device to perform resource selection or reselection.

If the terminal device is about to complete indication of all resources in time slot r, after time slot r-T3 or time slot r, if the resource preemption mechanism is deactivated, the terminal device does not consecutively perform resource sensing on the selected resources.

For example, in FIG. 6, the terminal device selects resources x, y, and z in time slot n. The first SL control information transmitted through resource x indicates resource x, resource y, and resource z, and the first SL control information transmitted through resource y indicates resource y and resource z. If the terminal device transmits the first SL control information on resource x, all time-frequency resources selected by the terminal device are indicated. A time slot where resource x is located is denoted as time slot r. After time slot r-T3 or time slot r, if the resource preemption mechanism is deactivated, the terminal device does not consecutively perform resource sensing on the selected resources (including the resource sensing on whether to perform resource reselection for the selected resources and/or whether the selected resources are preempted by other terminal devices mentioned above). $T3=T_{proc,1}$. $T_{proc,1}$ includes the time for the terminal device to perform resource selection or reselection.

Optionally, the above-mentioned priority threshold φ depends on network configuration, pre-configuration, or UE. In addition, a priority being higher than priority φ means that the priority is higher than that represented by φ. For example, 0-7 represent various priorities. If 0 represents the highest priority, 7 represents the lowest priority, and φ equals 3, then priorities higher than priority φ refer to priorities 0, 1, and 2. If 0 represents the lowest priority, 7 represents the highest priority, and φ equals 3, then priorities higher than priority φ refer to priorities 4, 5, 6, and 7.

It is to be noted for three cases that the terminal device performs resource selection at time n, performs resource selection in the re-evaluation process, and performs resource selection for preempted resources, a same SL-RSRP threshold or different SL-RSRP thresholds may be used.

It can be seen from the above illustration that the terminal device first performs the resource exclusion according to the non-sensing time slot (step 1-1), and then performs the resource exclusion according to the PSCCH sensed (step 1-2). If the number of remaining resources in candidate resource set A subject to the resource exclusion is smaller than $X \%*M_{total}$, then the terminal device increases the SL-RSRP threshold by 3 dB, and performs the operation at step 1 again (including step 1-1 and step 1-2). The purpose is to ensure that candidate resource set A subject to the resource exclusion includes at least $X \%*M_{total}$ resources. Possible values of X include {20, 35, 50}.

Exemplarily, the terminal device determines that X is equal to 50 according to the priority of data to be transmitted by the terminal device, and one time slot is equal to 1 millisecond. At step 1-1, if resource reservation period set M in the resource pool configuration includes smaller values such as 2 ms and 3 ms, it may be caused that in the operation at step 1-1 performed by the terminal device, m+q*Prxlg represents time slots{m+2, m+4, m+6, m+8 . . . } (when Prx equals 2 ms), and m+q*Prxlg represents time slots {m+3, m+6, m+9, m+12 . . . } (when Prx equals 3 ms). That is to say, at step 1-1, the terminal device may exclude, every two time slots, all resources in one time slot, or may exclude, every three time slots, all resources in one time slot. In this way, to a large extent, after the terminal device performs the operation at step 1-1, the number of the remaining resources in candidate resource set A is already smaller than 50%* $M_{total}$.

It is to be pointed out that increasing the SL-RSRP threshold can only reduce the number of the resources excluded at step 1-2, and there is no way to adjust the number of the resources excluded at step 1-1. Therefore, after the terminal device performs the operation at step 1-1, if the number of remaining resources in candidate resource set A is smaller than 50%*$M_{total}$, after further performing the operation at step 1-2, the number of remaining resources in resource set A is also smaller than 50%*$M_{total}$. Even if the terminal device increases the SL-RSRP threshold and performs the operation at step 1 again, the number of remaining resources in resource set A after the operation at step 1-1 performed this time is the same as the number of remaining resources after the operation at step 1-1 performed last time, which is also smaller than 50%*$M_{total}$. In this way, the terminal device may repeat the operation at step 1 and fall into an infinite loop. Implementations of the present disclosure provides a solution for resource exclusion, which can avoid this problem.

Figure 7:
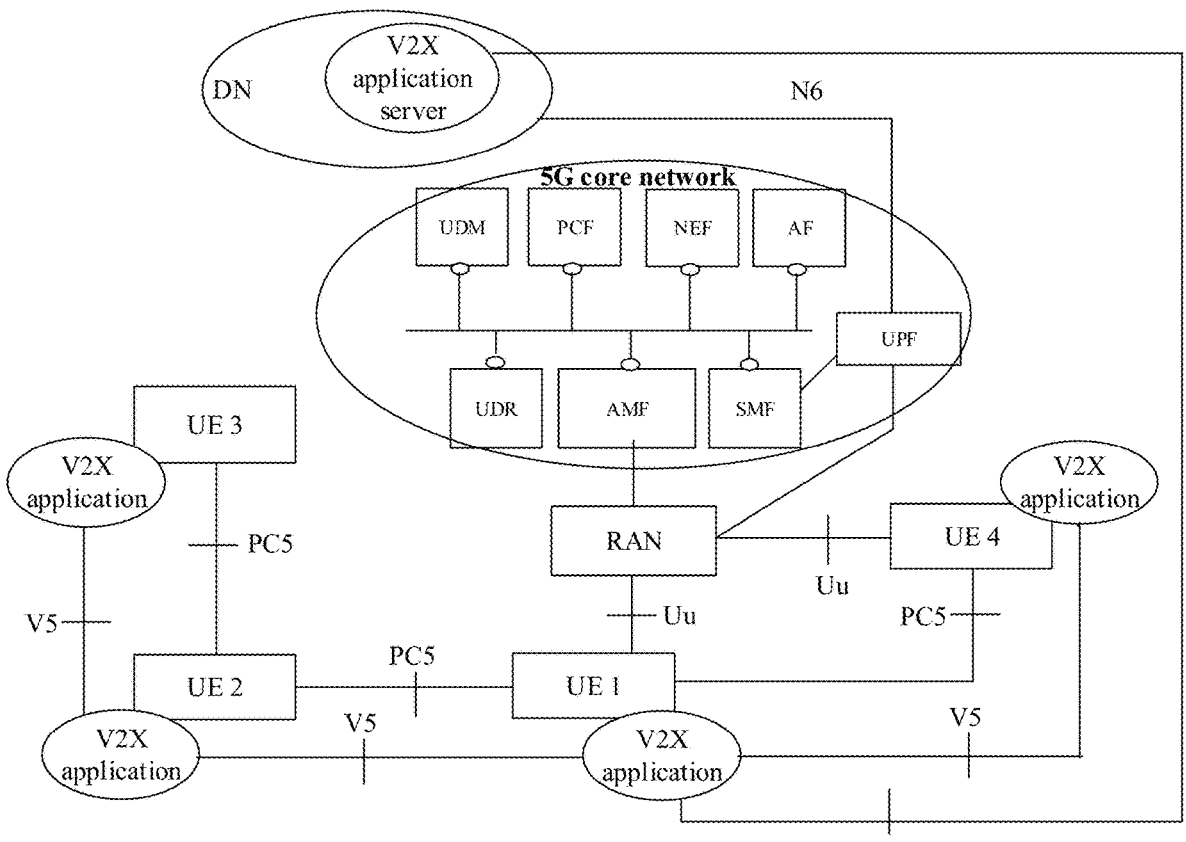
FIG. 7 is a block diagram illustrating a communication system supporting SL transmission provided in an exemplary implementation of the present disclosure.

FIG. 7 is a block diagram illustrating a communication system supporting SL transmission provided by an exemplary implementation of the present disclosure. The communication system can be illustrated in a schematic diagram of a non-roaming 5G system architecture, and the system architecture can be applied to a V2X service using D2D technology.

The system architecture includes a data network (DN). A V2X application server required by the V2X service is arranged in the data network. The system architecture also includes a 5G core network. Network functions of the 5G core network include: unified data management (UDM), policy control function (PCF), network exposure function (NEF), application function (AF), unified data repository (UDR), access and mobility management function (AMF), session management function (SMF), and user plane function (UPF).

The system architecture further includes a new generation-radio access network (NG-RAN) and four UEs exemplarily illustrated (i.e., UE 1 to UE 4). Each UE is provided with a V2X application. One or more access network devices, such as a next generation NodeB (gNB), are arranged in the RAN. The UE performs uplink transmission to the access network device.

In the system architecture, the data network and the UPF in the 5G core network are connected through an N6 reference point, the V2X application server and the V2X application in the UE are connected through a V1 reference point; the RAN are connected with the AMF function and the UPF function in the 5G core network, and the RAN is connected with UE 1 and UE 5 through Uu reference points; multiple UEs perform SL transmission through PC5 reference points, and multiple V2X applications are connected through V5 reference points. The above reference point may also be referred to as an "interface".

Figure 8:
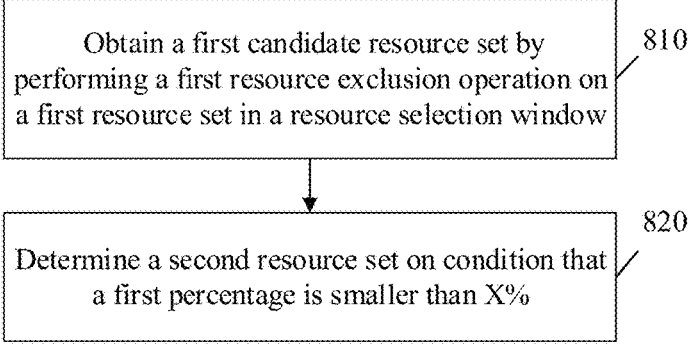
FIG. 8 is a flow chart illustrating a method for resource exclusion provided in an exemplary implementation of the present disclosure.

FIG. 8 is a flow chart illustrating a method for resource exclusion provided in an exemplary implementation of the present disclosure. In the implementation, take that the method is applied to any UE illustrated in FIG. 7 as an example for illustration. The UE is also known as a terminal device. The method includes the following.

At step 810, obtain a first candidate resource set by performing a first resource exclusion operation on a first resource set in a resource selection window.

The first resource set includes available resources in a resource pool used by the terminal device in the resource selection window. The resource selection window is a time window in which the terminal device performs resource selection for to-be-transmitted data.

The first resource exclusion operation includes performing resource exclusion according to a non-sensing slot in a resource sensing window, where the non-sensing slot represents a slot in which the terminal device performs no sensing. Remaining resources in the first resource set subject to the first resource exclusion operation form the first candidate resource set.

The first candidate resource set includes all or part of resources in the first resource set. For example, in the case where no non-sensing slot exists in the resource sensing window, the first candidate resource set includes all the resources in the first resource set. In the case where at least one non-sensing slot exist in the resource sensing window and no resource overlapping exists, the first candidate resource set includes all the resources in the first resource set. In the case where at least one non-sensing slot exists in the resource sensing window and resource overlapping exists, the first candidate resource set includes part of the resources in the first resource set.

Optionally, for the first resource exclusion operation, reference can be made to the foregoing resource exclusion at step 1-1. Exemplarily, the first resource exclusion operation includes that R(x, y) represents any resource in the first resource set. UE 1 transmits data and performs no sensing in time slot m (that is, non-sensing time slot) in the resource sensing window, then UE 1 determines whether time slot m+q*Prxlg and resource R(x, y+j*Ptxlg) overlap (fully or partially overlap). "Time slot m+q*Prxlg" represents a resource set that may be reserved by UE 2, and UE 2 is another terminal device relative to UE1. "Resource R(x, y+j*Ptxlg)" represents a resource set that UE 1 may use (select or reserve). If the two resource sets overlap, UE 1 excludes overlapping resource R(x,y) from the first resource set.

q=1, 2, 3 . . . , Q, Prxlg represents the number of logical time slots converted from Prx, and Prx represents all possible values in a resource reservation period set in resource pool configuration used by UE 1. j=0, 1, 2, 3 . . . , C−1, C is determined by a random counter value generated by UE1, Ptxlg represents the number of logical time slots converted from Ptx, and Ptx represents a resource reservation period determined by UE 1, which is one of the values in the resource reservation period set in the resource pool configuration used by UE1.

At step 820, determine a second resource set on condition that a first percentage is smaller than X %.

The first percentage is a percentage of the number of resources in the first candidate resource set and the number $M_{total}$ of the resources in the first resource set. The second resource set is a resource set formed by remaining resources after the terminal device performs resource exclusion (at least one time) on the first resource set.

Optionally, the terminal device first determines the first percentage after performing the first resource exclusion operation. If the first percentage is smaller than threshold X %, it means that the terminal device has excluded many resources and candidate resources for subsequent resource selection are not enough, then the terminal device does not directly perform a further resource exclusion on the first candidate resource set, and completes resource exclusion in other manners.

X is used to determine resource exclusion situation of the first resource set. Optionally, a value set of X includes {20, 30, 50}, and the value set represents a set of candidate values of X. The value set of X may also include other candidate values, which is not limited in this implementation of the present disclosure.

Optionally, the resource pool configuration used by the terminal device includes a correspondence between values in the value set and priorities of data to be transmitted. The resource pool configuration is configured by a network device or pre-configured. For example, optional values of a priority of data to be transmitted by the terminal device may include 0-7, where the smaller the value of the priority, the larger a value in the value set corresponding to the priority.

Optionally, after the terminal device determines the second resource set, the terminal device performs resource selection on the second resource set determined.

Optionally, a cause that the terminal device triggers the above resource exclusion process (i.e., the first resource exclusion operation) may include but is not limited to that when a data packet arrives at time n, the terminal device triggers the resource exclusion during a re-evaluation process, and triggers the resource exclusion when determining whether selected resources are preempted by other terminal devices.

If the cause for triggering the first resource exclusion operation is that the terminal device determines whether the selected resources are preempted by other terminal devices, a value of parameter j in R(x, y+j*ptxlg) used by the terminal device is 0.

In summary, according to the method provided in the implementation, after the terminal device obtains the first candidate resource set by performing the first resource exclusion operation, the terminal device first determines the resource exclusion condition according to the first percentage. In the case where the first percentage is smaller than X %, the terminal device does not directly perform a further resource exclusion on the first candidate resource set, and obtains the second resource set by completing resource exclusion in other manners, thereby avoiding a problem that the terminal device repeats resource exclusion (including step 1-1 and step 1-2).

In an alternative implementation of FIG. 8, the operation at step 820 can be replaced with following three implementation manners.

Implementation 1: on condition that the first percentage is smaller than X %, only perform the first resource exclusion operation.

The terminal device does not need to perform resource exclusion (i.e., second resource exclusion operation) according to a PSCCH sensed, determines the first candidate resource set as the second resource set, and directly selects resources from the first candidate resource set to transmit data.

Implementation 2: on condition that the first percentage is smaller than X %, a resource exclusion result of the first resource exclusion operation is not retained, and perform the second resource exclusion operation on the first resource set.

The second resource exclusion includes performing resource exclusion according to the PSCCH sensed in the resource sensing window. The terminal device abandons the resource exclusion result of the resource exclusion performed according to the non-sensing slot, and after performing the second resource exclusion operation on the first resource set, determines a second candidate resource set as the second resource set.

The second candidate resource set includes all or part of the resources in the first resource set. For example, in the case where no PSCCH is sensed in the resource sensing window, the second candidate resource set includes all the resources in the first resource set. In the case where a PSCCH is sensed in the resource sensing window, a measured RSRP is greater than an RSRP threshold, and resource overlapping exists, the second candidate resource set includes part of the resources in the first resource set.

Optionally, for the second resource exclusion operation, reference can be made to the foregoing resource exclusion at step 1-2. For example, the second resource exclusion operation includes that R(x, y) is any resource in the first resource set. If UE 1 senses a PSCCH on resource E(v, m) in time slot m in the resource sensing window, UE 1 measures RSRP of the PSCCH or RSRP of a PSSCH scheduled by the PSCCH (i.e., RSRP of the PSSCH transmitted together with the PSCCH). If the measured RSRP is greater than an RSRP threshold and UE 1 determines that resource E(v, m+q*Prxlg) and resource R(x, y+j*Ptxlg) overlap (fully or partially overlap), UE 1 excludes resource R(x, y) from the first resource set. "Resource E(v, m+q*Prxlg)" represents a resource set that may be reserved by UE 2, and UE 2 is another terminal device relative to UE 1. "Resource R(x, y+j*Ptxlg)" represents a resource set that UE 1 may use (select or reserve).

q=1, 2, 3 . . . , Q, Prxlg represents the number of logical time slots converted from Prx, and Prx represents a resource reservation period indicated in a resource reservation period field in first SL control information transmitted through the PSCCH that is sensed by UE 1. j=0, 1, 2, 3 . . . , C−1, C is determined by a random counter value generated by UE 1, Ptxlg represents the number of logical time slots converted from Ptx, and Ptx represents the resource reservation period determined by UE 1, which is one of the values in the resource reservation period set in the resource pool configuration used by UE1.

Implementation 3: on condition that the first percentage is smaller than X %, adjust X to be β, where β is not larger than the first percentage*100.

After obtaining β by adjustment, the terminal device further performs the second resource exclusion operation and then uses β as a threshold to determine resource exclusion situation.

The following will exemplarily illustrate the above three implementation manners.

Figure 9:
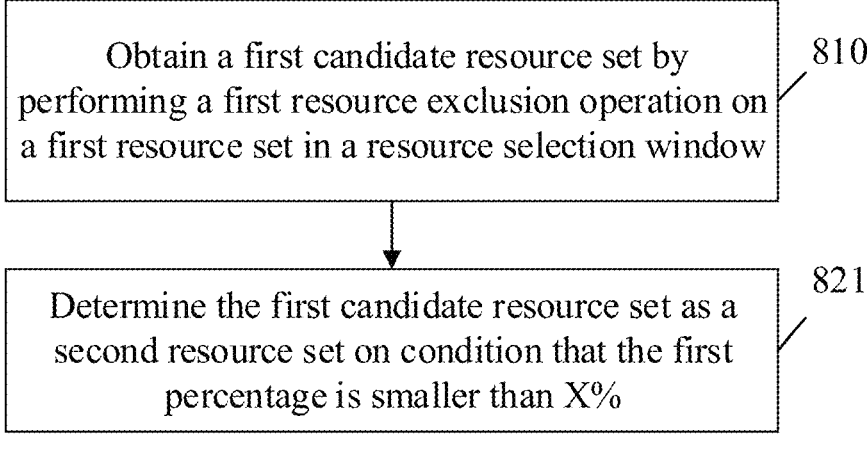
FIG. 9 is a flow chart illustrating a method for resource exclusion provided in an exemplary implementation of the present disclosure.

For the above implementation 1, in an alternative implementation of FIG. 8, step 820 is replaced with step 821. As illustrated in FIG. 9, at step 821, on condition that the first percentage is smaller than X %, determine the first candidate resource set as the second resource set.

In the case where the first percentage is smaller than X %, it means that the terminal device has excluded many resources and candidate resources for subsequent resource selection are not enough, and then the terminal device does not perform the second resource exclusion operation, and directly determines the first candidate resource set obtained by performing the first resource exclusion operation as the second resource set.

Optionally, after the terminal device determines the first candidate resource set as the second resource set, the terminal device performs resource selection on the second resource set determined.

In summary, according to the method provided in the implementation, after performing the first resource exclusion operation, if the percentage of the resources in the first candidate resource set and the number $M_{total}$ of the resources in the first resource set is smaller than X %, the terminal device does not perform the second resource exclusion operation and only performs the first resource exclusion operation, to avoid to exclude too many resources in the resource selection window, thereby avoiding repeating resource exclusion (including step 1-1 and step 1-2).

Figure 10:
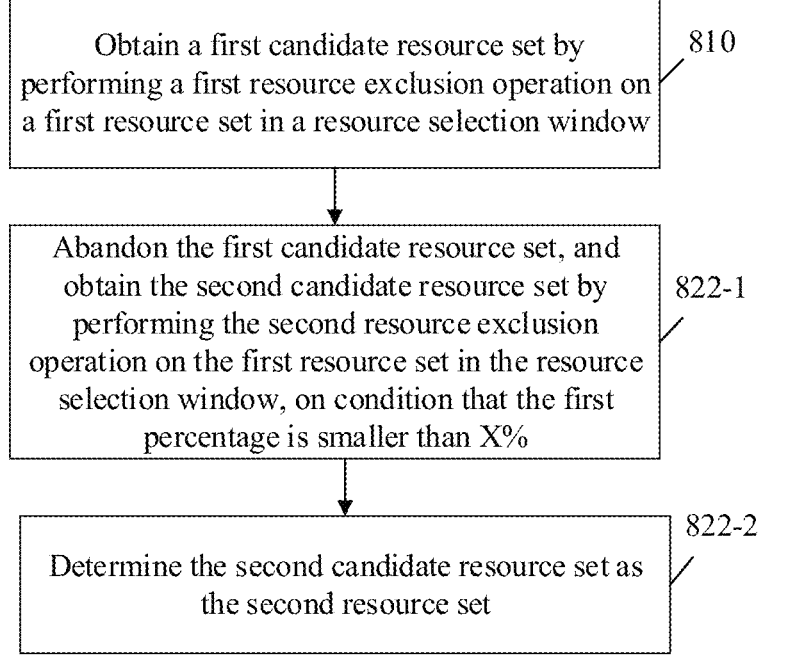
FIG. 10 is a flow chart illustrating a method for resource exclusion provided in an exemplary implementation of the present disclosure.

For the above implementation 2, in an alternative implementation of FIG. 8, step 820 is replaced with steps 822-1 and 822-2. As illustrated in FIG. 10, at step 822-1, on condition that the first percentage is smaller than X %, abandon the first candidate resource set, and obtain the second candidate resource set by performing the second resource exclusion operation on the first resource set in the resource selection window.

The second resource exclusion operation includes performing resource exclusion according to the PSCCH sensed in the resource sensing window. Remaining resources in the first resource set subject to the second resource exclusion operation form the second candidate resource set.

Optionally, the terminal device determines the first percentage after performing the first resource exclusion operation. If the first percentage is smaller than X %, it means that the terminal device has excluded many resources and candidate resources for subsequent resource selection are not enough, then the terminal device abandons the first candidate resource set (i.e., abandons an exclusion result of the first resource exclusion operation), performs resource exclusion on the first resource set again, and obtains the second candidate resource set by performing the second resource exclusion operation.

At step 822-2, determine the second candidate resource set as the second resource set.

The terminal device only retains the second resource exclusion operation on the first resource set, and determines the second candidate resource set as the second resource set.

Optionally, after step 822-2, the terminal device determines a second percentage, where the second percentage is a percentage of number of resources in the second resource set and the number $M_{total}$. If the second percentage is not smaller than X %, the second resource set is not updated. If the second percentage is smaller than X %, increase the RSRP threshold. According to the RSRP threshold increased, repeat at least one of the first resource exclusion operation or the second resource exclusion operation on the first resource set to update the second resource set, until the second percentage is not smaller than X %.

After obtaining the second resource set, the terminal device performs a further determination on the resource exclusion condition according to the second percentage. If the second percentage is not smaller than X %, the second resource set is not changed, and the terminal device can perform resource selection on the second resource set. If the second percentage is smaller than X %, it means that too many resources are excluded by the second resource exclusion operation, then the terminal device initiates the first resource set, and performs the resource exclusion operation (including at least one of the first resource exclusion operation or the second resource exclusion operation) on the first resource set again according to the RSRP threshold increased, to update the second resource set, so that there are enough resources for the terminal device to perform resource selection.

The RSRP threshold is related to the second resource exclusion operation. The RSRP threshold is compared with the measured RSRP of the PSCCH sensed or the measured RSRP of the PSSCH scheduled by the PSCCH. If the measured RSRP is not greater than the RSRP threshold, it is not necessary to perform resource exclusion on the first resource set. If the measured RSRP is greater than the RSRP threshold, it is necessary to perform resource exclusion on the first resource set. In conjunction with Table 1 mentioned above, the RSRP threshold before increasing is determined by priority P1 carried in the PSCCH sensed by the terminal device and priority P2 of data to be transmitted by the terminal device. Optionally, each time the RSRP threshold is increased by 3 dB.

In an implementation, repeating at least one of the first resource exclusion operation or the second resource exclusion operation includes repeating the second resource exclusion operation. In another implementation, repeating at least one of the first resource exclusion operation or the second resource exclusion operation includes repeating the first resource exclusion operation and the second resource exclusion operation, and abandoning the resource exclusion result of the first resource exclusion operation.

It is to be understood that the RSRP threshold is related to the second resource exclusion operation and is irrelated to the first resource exclusion operation. Using the RSRP threshold increased to perform resource exclusion again cannot change the result of the first resource exclusion operation, so that when the terminal device performs resource exclusion again, the terminal device can merely perform the second resource exclusion operation again, and can also perform both the first resource exclusion operation and the second resource exclusion operation again, but merely retains a resource exclusion result of the second resource exclusion operation.

Optionally, after completing the resource exclusion, the terminal device performs resource selection on the second resource set determined.

In summary, according to the method provided in the implementation, after performing the first resource exclusion operation, in the case where the percentage of the number of the resources in the first candidate resource set and the number $M_{total}$ of the resources in the first resource set is already smaller than X %, the resource exclusion result of the first resource exclusion operation is not retained, and only the second resource exclusion operation is performed, which can avoid to exclude too many resources in the resource selection window, and accordingly avoiding repeating resource exclusion (including step 1-1 and step 1-2).

For the above implementation 3, in an alternative implementation of FIG. 8, step 820 is replaced with steps 823-1, 823-2, and 832-3. As illustrated in FIG. 11, at step 823-1, if the first percentage is smaller than X %, adjust X to be β.

β satisfies a first condition, where the first condition includes that β is not larger than the first percentage*100.

Optionally, the terminal device determines the first percentage after performing the first resource exclusion operation. In the case where the first percentage is smaller than X %, if the terminal device performs further resource exclusion, a percentage of the number of remaining resources obtained by the further resource exclusion and the number $M_{total}$ is definitely smaller than X %, and thus the terminal decreases X to be β, to enable that the terminal device can use β which is relatively small to determine resource exclusion condition.

At step 823-2, obtain the second resource set by performing the second resource exclusion operation on the first candidate resource set.

The second resource exclusion operation includes performing resource exclusion according to the PSCCH sensed in the resource sensing window. After performing the first resource exclusion operation, the terminal device further performs the second resource exclusion operation, and remaining resources forms the second resource set.

At step 823-3, according to β obtained by adjustment, determine whether there is a need to repeat the first resource exclusion operation and the second resource exclusion operation to update the second resource set.

Optionally, the terminal device determines the second percentage, where the second percentage is the percentage of the number of the resources in the second resource set and the number $M_{total}$. If the second percentage is not smaller than β %, the second resource set is not updated. If the second percentage is smaller than β %, increase the RSRP threshold. According to the RSRP threshold increased, repeat the first resource exclusion operation and the second resource exclusion operation on the first resource set to update the second resource set, until the second percentage is not smaller than β %.

It is to be understood that when repeat the resource exclusion operation to ensure that there are enough candidate resources for the terminal device to perform resource selection, use X reset (i.e., β).

Optionally, β is determined in any of the following manners.

1. β is a maximum value satisfying a first condition in a first value set or any value in the first value set.

The first value set is a set of candidate values of β. Optionally, the first value set includes {20, 35, 50}. The first value set is configured by a network device or pre-configured.

For example, if X equals 50, the first percentage equals 40%, then the first condition is that β is not larger than 40. β is 35 that is the maximum value satisfying the first condition in the first value set, or β is 20 or 35 that satisfies the first condition in the first value set.

2. β is a value in the first value set determined by the terminal device according to the number of time-frequency resources required to be selected.

Exemplarily, the number of available resources in each slot is N1, and the terminal device needs to perform N2 transmissions, i.e., N2 time-frequency resources are selected to be distributed in N2 time slots, then the terminal device determines that β needs to satisfy $\beta \%*M_{total}>=N1*N2$.

3. β equals the first percentage*100.

Exemplarily, X equals 50, the first percentage equals 44%, then β equals 44.

4. β is a value determined by the terminal device according to the number of time-frequency resources required to be selected.

5. The value of β depends on the terminal device.

In summary, according to the method provided in the implementation, after the first resource exclusion operation, if the percentage of the number of the resources in the first candidate resource set and the number $M_{total}$ of the resources in the first resource set is already smaller than X %, adjust X to be β, and β is not larger than the first percentage*100, which can avoid a case that too many resources in the resource selection window are excluded to cause the terminal device to repeat resource exclusion.

In addition to the above three implementation manners, the terminal device can further solve, according to implementation manner 4, the problem that too many resources in the resource selection window are excluded.

Implementation 4: in the case where the resource reservation period set includes too small values, perform merely the second resource exclusion operation.

In conjunction with FIG. 12, FIG. 12 is a flow chart illustrating a method for resource exclusion provide in an exemplary implementation of the present disclosure. In the implementation, take that the method is applied to any UE in FIG. 7 as an example for illustration. The UE is also known as terminal device. The method includes the following.

At step 1210, in the case where a resource reservation period set includes a value not larger than α, obtain a second resource set by performing a second resource exclusion operation on a first resource set in a resource selection window.

The first resource set includes available resources in a resource pool used by the terminal device in the resource selection window. The second resource exclusion operation includes performing resource exclusion according to a PSCCH sensed in a resource sensing window.

When the terminal device transmits data, the terminal device can reserve resources for next period according to a resource reservation period. Exemplarily, possible values of the resource reservation period may include 0, [1, 99], 100, 200, 300, 400, 500, 600, 700, 800, 900, 1000 milliseconds. A resource reservation period set in resource pool configuration includes e values in the above values. Exemplarily, e equals 16.

It can be understood that in the case where the resource reservation period set includes relatively small values, when the terminal device performs the first resource exclusion operation, too many resources may be excluded. In order to avoid the above case, before the terminal device performs resource exclusion, the terminal device first determines whether the resource reservation period set includes a value not larger than $\alpha$. If the resource reservation period set includes a value not larger than $\alpha$, the terminal device does not perform (skip) the first resource exclusion operation, and obtains the second resource set by directly performing the second resource exclusion operation on the first resource set in the resource selection window.

Optionally, $\alpha$ is configured by a network device, or pre-configured, or depends on the terminal device.

Alternatively, for the second resource exclusion operation, reference can be made to the resource exclusion at step 1-2. Exemplarily, the second resource exclusion operation includes that R(x, y) is any resource in the first resource set. If UE 1 senses a PSCCH on resource E(v, m) in time slot m in the resource sensing window, UE 1 measures RSRP of the PSCCH or RSRP of a PSSCH scheduled by the PSCCH (that is, the RSRP of the PSSCH transmitted together with the PSCCH). If the measured RSRP is greater than an RSRP threshold, and UE 1 determines that resource E(v, m+q*Prxlg) and resource R(x, y+j*Ptxlg) overlap (fully or partially overlap), then corresponding resource R(x, y) is excluded from the first resource set. "Resource E(v, m+q*Prxlg)" represents a resource set that may be reserved by UE 2, and UE 2 is another terminal device relative to UE 1. "R(x, y+j*Ptxlg)" represents a resource set that UE 1 may use (select or reserve).

q=1, 2, 3 . . . , Q, Prxlg represents the number of logical time slots converted from Prx, and Prx represents a resource reservation period indicated in a resource reservation period field in first SL control information transmitted through the PSCCH sensed by UE 1. j=0, 1, 2, 3 . . . , C−1, C is determined by a random counter value generated by UE 1, Ptxlg represents the number of logical time slots converted from Ptx, and Ptx represents a resource reservation period determined by UE 1, which is one of values in the resource reservation period set in the resource pool configuration used by UE 1.

Alternatively, after step 1210, the terminal device determines a second percentage, where the second percentage is a percentage of the number of resources in the second resource set and number $M_{total}$ of resources in the first resource set. If the second percentage is not smaller than X %, the second resource set is not updated. If the second percentage is smaller than X %, increase the RSRP threshold. According to the RSRP threshold increased, repeat the second resource exclusion operation on the first resource set to update the second resource set, until the second percentage is not smaller than X %.

X is use to determine a resource exclusion condition of the first resource set. X corresponds to a second value set, where the second value set is a set of candidate values of X.

Optionally, the second value set includes {20, 35, 50}. The value set of X may include other candidate values, which is not limited in the implementation of the present disclosure.

Optionally, the resource pool configuration for the terminal device includes a correspondence between values in the second value set and priorities of data to be transmitted. The resource pool configuration can be configured by the network device or pre-configured.

Optionally, a cause that the terminal device triggers the above resource exclusion process (i.e., triggers the second resource exclusion operation) includes but is not limited to that when a data packet arrives at time n, the terminal device triggers resource exclusion during a re-evaluation process, and the terminal device triggers resource exclusion when determining whether selected resources are preempted by other terminal devices.

In the case where the cause for triggering the second resource exclusion operation is that the terminal device determines whether selected resources are preempted by other terminal devices, a value of parameter j in R(x, y+j*ptxlg) used by the terminal device equals 0.

In summary, according to the method provided in the implementation, before the resource exclusion, the terminal device makes a pre-determination on a resource exclusion condition according to the values in the resource reservation period set. In the case where the resource reservation period set includes a value not larger than $\alpha$, the terminal device may exclude too many resources by performing the first resource exclusion operation, and thus the terminal device merely performs the second resource exclusion operation to avoid a problem that too many resources in the resource selection window are excluded.

After initial resource selection is completed, the terminal device generally needs to consecutively perform resource sensing to determine whether there is a need to perform resource reselection for selected resources and/or determine whether the selected resources are preempted by other terminal devices.

FIG. 13 is a flow chart illustrating a method for resource processing provided in an exemplary implementation of the present disclosure. The method is applied to a terminal device and includes the following.

At step 1310, determine whether to perform a target operation on a selected resource according to first information.

The selected resource is a resource selected for a to-be-transmitted data packet after the terminal device performs resource selection. The target operation includes at least one of a resource sensing operation, a resource preemption determining operation, or a resource exclusion operation. The resource preemption determining operation is an operation of determining whether the selected resource is preempted by other terminal devices.

Optionally, the selected resource is the resource selected for the to-be-transmitted data packet after the terminal device performs resource selection on an obtained second resource set according to the resource exclusion process in the implementation in FIG. 8, FIG. 9, FIG. 10, FIG. 11, or FIG. 12. Optionally, the selected resource is the resource selected for the to-be-transmitted data packet after the terminal device performs resource selection on an obtained candidate resource set according to an existing resource exclusion process.

In an implementation, step 1310 is implemented as follows. Determine whether to perform the target operation on the selected resource according to a priority of the to-be-transmitted data packet.

The to-be-transmitted data packet has a priority. The priority corresponds to a value range ranging from 0 to 7. The highest priority refers to the highest priority value in the priority value range.

1) In the case where the priority of the to-be-transmitted data packet is the highest priority or higher than a priority threshold, after the resource selection is completed, perform no resource sensing operation on whether the selected resource is preempted by other terminal devices.

Since the terminal device does not consecutively perform resource sensing on whether the selected resource is preempted by other terminal devices, the terminal device also does not determine whether the selected resource is preempted by other terminal devices, and does not trigger the resource exclusion operation in the process of determining resource preemption.

2) In the case where the priority of the to-be-transmitted data packet is the highest priority or higher than the priority threshold, after the resource selection is completed, perform no resource preemption determining operation, and trigger no resource exclusion operation.

The above resource exclusion operation refers to the resource exclusion operation in the process of determining resource preemption.

3) In the case where the priority of the to-be-transmitted data packet is the highest priority or higher than the priority threshold, after time slot r-$T_{proc,1}$ or time slot r, the terminal device does not consecutively perform the resource sensing operation on the selected resource.

Time slot r is a slot in which the terminal device completes resource indication by transmitting first SL control information.

Optionally, $T_{proc,1}$ includes the time for the terminal device to perform resource selection or reselection. When a subcarrier spacing is 15, 30, 60, or 120 kHz, $T_{proc,1}$ corresponds to 3, 5, 9, or 17 time slots.

Optionally, skipping consecutive performing of the resource sensing operation on the selected resources includes skipping consecutive performing of resource sensing on whether there is a need to perform reselection for the selected resource, and/or skipping consecutive performing of resource sensing on whether the selected resource is preempted by other terminal devices.

In the case where the priority of the to-be-transmitted data packet is the highest priority or higher than the priority threshold, after time slot r-$T_{proc,1}$ or time slot r, perform no determination on whether the selected resource is preempted by other terminal devices, and trigger no resource exclusion operation.

The above resource exclusion operation refers to the resource exclusion operation in the process of determining resource preemption.

Time slot r is a slot in which the terminal device completes resource indication by transmitting first SL control information.

Optionally, $T_{proc,1}$ includes the time for the terminal device to perform resource selection or reselection. When the subcarrier spacing is 15, 30, 60, or 120 kHz, $T_{proc,1}$ corresponds to 3, 5, 9, or 17 time slots.

Optionally, the priority threshold for the to-be-transmitted data packet is configured by a network device, or pre-configured, or determined by the terminal device.

Optionally, the above resource exclusion operation includes at least one of a third resource exclusion operation or a fourth resource exclusion operation. The third resource exclusion operation includes performing resource exclusion according to a non-sensing slot, where the non-sensing slot refers to a slot in which the terminal device performs no sensing. The fourth resource exclusion operation includes performing resource exclusion according to a PSCCH sensed.

Specifically, for that the terminal device determines how to perform resource exclusion through at least one of the third resource exclusion operation or the fourth resource exclusion operation, reference can be made to a resource exclusion process performed during initial resource selection performed by the terminal device in the above implementations, and also reference can be made to an existing resource process. There is no limitation on a specific resource exclusion process in implementations of the present disclosure.

In another implementation, step 1310 is implemented as follows. Determine whether to perform the target operation on the selected resource according to status of a resource preemption mechanism.

The status of the resource preemption mechanism incudes activation or deactivation. Optionally, in the case where the resource preemption mechanism is activated, after time slot r-$T_{proc,1}$ or slot r, skip consecutive performing of the resource sensing operation on the selected resource.

Time slot r is a slot in which the terminal device completes resource indication by transmitting the first SL control information.

Optionally, $T_{proc,1}$ includes the time for the terminal device to perform resource selection or reselection. When the subcarrier spacing is 15, 30, 60, or 120 kHz, $T_{proc,1}$ corresponds to 3, 5, 9, or 17 time slots.

Optionally, skipping consecutive performing of the resource sensing operation on the selected resource includes skipping consecutive performing of resource sensing on whether there is a need to perform reselection for the selected resource, and/or skipping consecutive performing resource sensing on whether the selected resource is preempted by other terminal devices.

Optionally, the resource preemption mechanism is deactivated according to network device configuration, or pre-configuration, or is deactivated by the terminal device according to a first measurement result of a CR or a second measurement result of a CBR.

Exemplarily, in the case where the first measurement result (or the second measurement result) is lower than a certain threshold, the resource preemption mechanism is deactivated, and in the case where the first measurement result (or the second measurement result) is higher than a certain threshold, the resource preemption mechanism is activated.

In summary, according to the method provided in implementations of the present disclosure, after initial resource selection is completed, according to the priority of the to-be-transmitted data or the status of the resource preemption mechanism, the terminal device can determine whether there is a need to perform the subsequent target operation such as the resource sensing operation and the resource preemption determining operation, such that when the priority of the to-be-transmitted data packet is relatively high or the resource preemption resource is deactivated, the terminal device does not perform subsequent operations, thereby reducing unnecessary invalid operation.

It is to be noted that, the foregoing method implementations may be implemented separately, or may be implemented in combination, which is not limited in the present disclosure.

Figure 14:
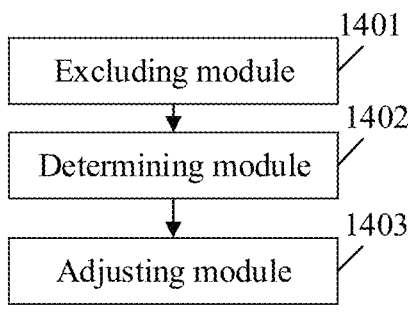
FIG. 14 is a structural block diagram illustrating an apparatus for resource exclusion provided in an exemplary implementation of the present disclosure.

FIG. 14 is a block diagram illustrating an apparatus for resource exclusion provided in an exemplary implementation of the present disclosure. The apparatus is applied to a terminal device, or the apparatus is implemented as the terminal device or a part of the terminal device. The apparatus includes an excluding module 1401 and a determining module 1402.

The excluding module 1401 is configured to obtain a first candidate resource set by performing a first resource exclusion operation on a first resource set in a resource selection window, where the first resource set includes available resources in a resource pool used by the terminal device in the resource selection window, the first resource exclusion operation includes performing resource exclusion according to a non-sensing slot in a resource sensing window, and the non-sensing slot represents a slot in which the terminal device performs no sensing.

The determining module 1402 is configured to determine a second resource set on condition that a first percentage is smaller than X %, where the first percentage is a percentage of number of resources in the first candidate resource set and number $M_{total}$ of resources in the first resource set.

In an alternative implementation, the determining module 1402 is configured to determine the first candidate resource set as the second resource set.

In an alternative implementation, the excluding module 1401 is configured to abandon the first candidate resource set, and obtain a second candidate resource set by performing a second resource exclusion operation on the first resource set in the resource selection window. The determining module 1402 is configured to determine the second candidate resource set as the second resource set, where the second resource exclusion operation includes performing resource exclusion according to a PSCCH sensed in the resource sensing window.

In an alternative implementation, the determining module 1402 is configured to determine a second percentage, where the second percentage is a percentage of number of resources in the second resource set and the number $M_{total}$. The excluding module 1401 is configured to skip updating of the second resource set in response to the second percentage being not smaller than X %, increase an RSRP threshold in response to the second percentage being smaller than X %, and repeat, according to the RSRP threshold increased, at least one of the first resource exclusion operation or the second resource exclusion operation on the first resource set to update the second resource set, until the second percentage is not smaller than X %.

In an alternative implementation, the excluding module 1401 is configured to repeat the second resource exclusion operation on the first resource set. Alternatively, the excluding module 1401 is configured to repeat the first resource exclusion operation and the second resource exclusion operation on the first resource set, and abandon a resource exclusion result of the first resource exclusion operation.

In an alternative implementation, the apparatus further includes an adjusting module 1403 configured to adjust X to be β. The excluding module 1401 is configured to obtain the second resource set by performing a second resource exclusion operation on the first candidate resource set. The determining module 1402 is configured to determine, according to β obtained by adjustment, whether to repeat the first resource exclusion operation and the second resource exclusion operation to update the second resource set. β satisfies a first condition, and the first condition includes that β is not larger than the first percentage*100, and the second resource exclusion operation includes performing resource exclusion according to a PSCCH sensed in the resource sensing window.

In an alternative implementation, the determining module 1402 is configured to determine a second percentage, where the second percentage is a percentage of number of resources in the second resource set and the number $M_{total}$. The excluding module 1401 is configured to skip updating of the second resource set in response to the second percentage being not smaller than β %, increase an RSRP threshold in response to the second percentage being smaller than β %, and repeat, according to the RSRP threshold increased, the first resource exclusion operation and the second resource exclusion operation on the first resource set to update the second resource set, until the second percentage is not smaller than β %.

In an alternative implementation, β is a maximum value satisfying the first condition in a first value set, where the first value set is a set of candidate values of β. Alternatively, β is any value satisfying the first condition in the first value set. Alternatively, β is a value in the first value set determined by the terminal device according to number of time-frequency resources required to be selected. Alternatively, β equals the first percentage*100. Alternatively, β is a value determined by the terminal device according to the number of the time-frequency resources required to be selected. Alternatively, β is determined by the terminal device.

In an alternative implementation, the first value set includes {20, 35, 50}.

In an alternative implementation, X corresponds to a second value set, where the second value set is a set of candidate values of X, and the second value set includes {20, 35, 50}.

In an alternative implementation, a resource pool configuration for the terminal device includes a correspondence between values in the second value set and priorities of data to be transmitted, where the resource pool configuration is configured by a network device or pre-configured.

In an alternative implementation, on condition that a trigger cause of the first resource exclusion operation is that the terminal device determines whether a selected resource is preempted by other terminal devices, a value of parameter j used by the terminal device is 0.

Figure 15:
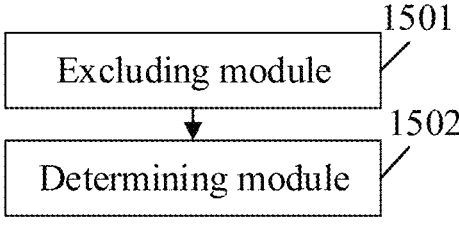
FIG. 15 is a structural block diagram illustrating an apparatus for resource exclusion provided in an exemplary implementation of the present disclosure.

FIG. 15 is a block diagram illustrating an apparatus for resource exclusion provided in an exemplary implementation of the present disclosure. The apparatus is applied to a terminal device, or implemented as the terminal device or a part of the terminal device. The apparatus includes an excluding module 1501.

The excluding module 1501 is configured to obtain a second resource set by performing a second resource exclusion operation on a first resource set in a resource selection window on condition that a resource reservation period set includes a value not larger than α, where the first resource set includes available resources in a resource pool used by the terminal device in the resource selection window, and the second resource exclusion operation includes performing resource exclusion according to a PSCCH sensed in a resource sensing window.

In an alternative implementation, a is configured by a network device, a is pre-configured, or a is determined by the terminal device.

In an alternative implementation, the apparatus further includes a determining module 1502. The determining module 1502 is configured to determine a second percentage, where the second percentage is a percentage of number of resources in the second resource set and number $M_{total}$ of resources in the first resource set. The excluding module 1501 is configured to skip updating of the second resource set in response to the second percentage not being smaller than X %, increase an RSRP threshold in response to the second percentage being smaller than X %, and repeat, according to the RSRP threshold increased, the second resource exclusion operation on the first resource set to update the second resource set, until the second percentage is not smaller than X %.

In an alternative implementation, X corresponds to a second value set, where the second value set is a set of candidate values of X, and the second value set includes {20, 35, 50}.

In an alternative implementation, a resource pool configuration for the terminal device includes a correspondence between values in the second value set and priorities of data to be transmitted, where the resource pool configuration is configured by a network device or pre-configured.

In an alternative implementation, on condition that a trigger cause of the second resource exclusion operation is that the terminal device determines whether a selected resource is preempted by other terminal devices, a value of parameter j used by the terminal device is 0.

Figure 16:
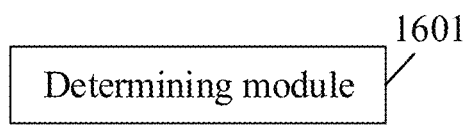
FIG. 16 is a structural block diagram illustrating an apparatus for resource processing provided in an exemplary implementation of the present disclosure.

FIG. 16 is a block diagram illustrating an apparatus for resource processing provided in an exemplary implementation of the present disclosure. The apparatus is applied to a terminal device, or implemented as a terminal device or a part of the terminal device. The apparatus includes a determining module 1601.

The determining module 1601 is configured to determine whether to perform a target operation on a selected resource according to first information, where the selected resource is a resource selected for a to-be-transmitted data packet after the terminal device performs resource selection, the target operation includes at least one of: a resource sensing operation, a resource preemption determining operation, or a resource exclusion operation, and the resource preemption determining operation is that the terminal device determines whether the selected resource is preempted by other terminal devices.

In an alternative implementation, the determining module 1601 is configured to determine whether to perform the target operation on the selected resource according to a priority of the to-be-transmitted data packet.

In an alternative implementation, the determining module 1601 is configured to skip performing of the resource sensing operation on whether the selected resource is preempted by the other terminal devices after the resource selection, on condition that the priority of the to-be-transmitted data packet is a highest priority or higher than a priority threshold.

In an alternative implementation, the determining module 1601 is configured to skip performing of the resource preemption determining operation and skip triggering of the resource exclusion operation after the resource selection, on condition that the priority of the to-be-transmitted data packet is the highest priority or higher than the priority threshold.

In an alternative implementation, the determining module 1601 is configured to skip consecutive performing of the resource sensing operation on the selected resource after time slot r-$T_{proc,1}$ or slot r, on condition that the priority of the to-be-transmitted data packet is the highest priority or higher than the priority threshold, where time slot r is a slot in which the terminal device completes resource indication by transmitting first SL control information.

In an alternative implementation, the determining module 1601 is configured to skip performing of the resource preemption determining operation and skipping triggering of the resource exclusion operation after time slot r-$T_{proc,1}$ or slot r, on condition that the priority of the to-be-transmitted data packet is the highest priority or higher than the priority threshold, where time slot r is the slot in which the terminal device completes resource indication by transmitting the first SL control information.

In an alternative implementation, the priority threshold is configured by a network device, or pre-configured, or determined by the terminal device.

In an alternative implementation, the resource exclusion operation includes at least one of a third resource exclusion operation or a fourth resource exclusion operation, where the third resource exclusion operation includes performing resource exclusion according to a non-sensing slot, the non-sensing slot is a slot in which the terminal device performs no sensing, and the fourth resource exclusion operation includes performing resource exclusion according to a PSCCH sensed.

In an alternative implementation, the determining module 1601 is configured to determine whether to perform the target operation on the selected resource according to status of a resource preemption mechanism.

In an alternative implementation, the determining module 1601 is configured to skip consecutive performing of the resource sensing operation on the selected resource after time slot r-$T_{proc,1}$ or slot r, on condition that the resource preemption mechanism is deactivated, where slot r is the slot in which the terminal device completes resource indication by transmitting the first SL control information.

In an alternative implementation, the resource preemption mechanism is deactivated according to network device configuration, deactivated according to pre-configuration, deactivated by the terminal device according to a first measurement result of a CR, or deactivated by the terminal device according to a second measurement result of a CBR.

Figure 17:
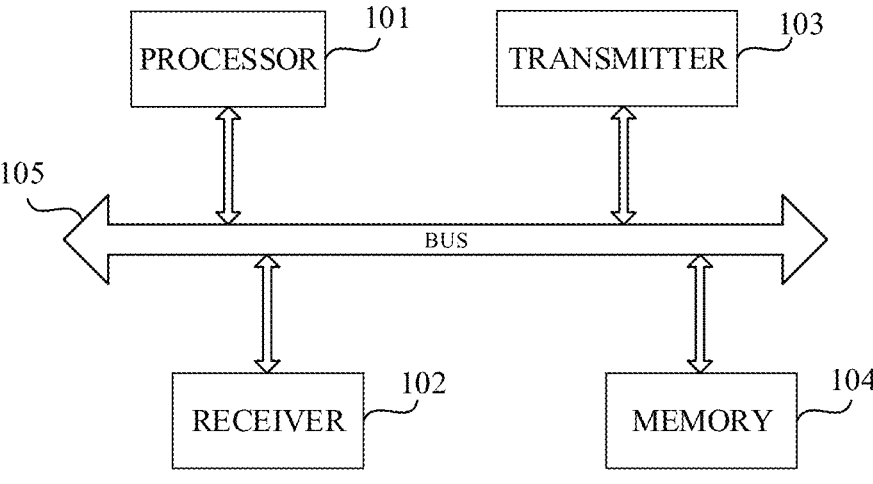
FIG. 17 is a schematic structural diagram illustrating a communication device provided in an exemplary implementation of the present disclosure.

FIG. 17 is a schematic structural diagram illustrating a communication device (network device or terminal device) provided in an exemplary implementation of the present disclosure. The communication device includes a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication component, which may be a communication chip.

The memory 104 is coupled to the processor 101 through the bus 105.

The memory 104 may be configured to store at least one instruction, and the processor 101 may be configured to execute the at least one instruction to implement various steps in the foregoing method implementations.

Additionally, the memory 104 may be implemented by any type or combination of volatile or non-volatile storage devices including, but not limited to, magnetic or optical disk, electrically erasable programmable read only memory (EEPROM), erasable programmable read only memory (EPROM), static random access memory (SRAM), ROM, magnetic memory, flash memory, and programmable read-only memory (PROM).

In an exemplary implementation, a computer-readable storage medium is also provided, where the computer-readable storage medium stores at least one instruction, at least one piece of program, a code set, or an instruction set. The at least one instruction, the code set, or the instruction set is loaded and executed by the processor to implement the method for resource exclusion or the method for resource processing executed by the terminal device provided in the above-mentioned various method implementations.

In an exemplary implementation, a computer program product or computer program is also provided. The computer program product or computer program includes computer instructions stored in a computer-readable storage medium. A processor of a computer device can read the computer instructions from the computer-readable storage medium, and executes the computer instructions, so that the computer device executes the method for resource exclusion or the method for resource processing described in the above aspects.

Those of ordinary skill in the art can understand that all or part of the steps for implementing the above implementations can be completed by hardware, or can be completed by instructing relevant hardware through a program, where the program can be stored in a computer-readable storage medium. The storage medium mentioned may be a ROM, a magnetic disk, an optical disk, or the like.

The above are only optional implementations of the present disclosure, and are not intended to limit the present disclosure. Any modifications, equivalent replacements, improvements, etc. made within the spirit and principles of the present disclosure shall be included in the scope of protection of the present disclosure.

What is claimed is:

1. A method for resource exclusion, the method being applied to a terminal device and comprising:

obtaining a first candidate resource set by performing a first resource exclusion operation on a first resource set in a resource selection window, the first resource set comprising available resources in a resource pool used by the terminal device in the resource selection window, and the first resource exclusion operation comprising: performing resource exclusion according to a non-sensing slot in a resource sensing window, the non-sensing slot representing a slot in which the terminal device performs no sensing; and determining a second resource set on condition that a first percentage is smaller than X %, the first percentage being a percentage of number of resources in the first candidate resource set out of number $M_{total}$ of resources in the first resource set;

wherein the method further comprises:

performing a target operation on a resource selected from the second resource set and selected for a to-be-transmitted data packet when the to-be-transmitted data packet does not satisfy a condition; or skipping performing of the target operation on the resource selected from the second resource set and selected for the to-be-transmitted data packet when the to-be-transmitted data packet satisfies the condition;

wherein the target operation comprises at least a resource sensing operation.

2. The method of claim 1, wherein:

determining the second resource set comprises:

obtaining a second candidate resource set by performing a second resource exclusion operation on the first resource set in the resource selection window, wherein the second resource exclusion operation comprises performing resource exclusion according to a physical sidelink control channel (PSCCH) sensed in the resource sensing window;

the method further comprises:

determining a second percentage, the second percentage being a percentage of number of resources in the second resource set out of the number $M_{total}$;

skipping updating of the second resource set in response to the second percentage being not smaller than the X %; and increasing a reference signal receiving power (RSRP) threshold in response to the second percentage being smaller than the X %; and repeating, according to the RSRP threshold increased, at least one of the first resource exclusion operation or the second resource exclusion operation on the first resource set to update the second resource set, until the second percentage is not smaller than the X %.

3. The method of claim 2, wherein repeating at least one of the first resource exclusion operation or the second resource exclusion operation on the first resource set comprises:

repeating the second resource exclusion operation on the first resource set; or repeating the first resource exclusion operation and the second resource exclusion operation on the first resource set, and abandoning a resource exclusion result of the first resource exclusion operation.

4. The method of claim 1, wherein a resource pool configuration for the terminal device comprises a correspondence between values in the value set and priorities of data to be transmitted, wherein the resource pool configuration is configured by a network device or pre-configured.

5. A terminal device comprising:

a processor; and a memory storing a computer program;

wherein the computer program being executed by the processor to cause the terminal device to:

obtain a first candidate resource set by performing a first resource exclusion operation on a first resource set in a resource selection window, the first resource set comprising available resources in a resource pool used by the terminal device in the resource selection window, and the first resource exclusion operation comprising performing resource exclusion according to a non-sensing slot in a resource sensing window, the non-sensing slot representing a slot in which the terminal device performs no sensing; and determine a second resource set on condition that a first percentage is smaller than X %, the first percentage being a percentage of number of resources in the first candidate resource set out of number $M_{total}$ of resources in the first resource set;

wherein the computer program is further executed by the processor to cause the terminal device to:

perform a target operation on a resource selected from the second resource set and selected for a to-be-transmitted data packet when the to-be-transmitted data packet does not satisfy a condition; or skip performing of the target operation on the resource selected from the second resource set and selected for the to-be-transmitted data packet when the to-be-transmitted data packet satisfies the condition;

wherein the target operation comprises at least a resource sensing operation.

6. The terminal device of claim 5, wherein causing the terminal device to determine the second resource set further causes the terminal device to obtain a second candidate resource set by performing a second resource exclusion operation on the first resource set in the resource selection window, wherein the second resource exclusion operation comprises performing resource exclusion according to a physical sidelink control channel (PSCCH) sensed in the resource sensing window;

wherein the computer program is further executed by the processor to cause the terminal device to:

determine a second percentage, wherein the second percentage is a percentage of number of resources in the second resource set out of the number $M_{total}$;

skip updating of the second resource set in response to the second percentage being not smaller than the X %; and increase a reference signal receiving power (RSRP) threshold in response to the second percentage being smaller than the X %; and repeat, according to the RSRP threshold increased, at least one of the first resource exclusion operation or the second resource exclusion operation on the first resource set to update the second resource set, until the second percentage is not smaller than the X %.

7. The terminal device of claim 6, wherein the computer program executed by the processor to cause the terminal device to repeat at least one of the first resource exclusion operation or the second resource exclusion operation on the first resource set further causes the terminal device to:

repeat the second resource exclusion operation on the first resource set; or repeat the first resource exclusion operation and the second resource exclusion operation on the first resource set, and abandon a resource exclusion result of the first resource exclusion operation.

8. The terminal device of claim 5, wherein the computer program executed by the processor to cause the terminal device to determine the second resource set further causes the terminal device to:

adjust the X to be β;

obtain the second resource set by performing a second resource exclusion operation on the first candidate resource set; and determine, according to the β obtained by adjustment, whether to repeat the first resource exclusion operation and the second resource exclusion operation on the first resource set to update the second resource set;

wherein the β satisfies a first condition, and the first condition comprises that the β is not larger than the first percentage *100, and the second resource exclusion operation comprises performing resource exclusion according to a PSCCH sensed in the resource sensing window.

9. The terminal device of claim 8, wherein the computer program executed by the processor to cause the terminal device to determine whether to repeat the first resource exclusion operation and the second resource exclusion operation on the first resource set further causes the terminal device to:

determine a second percentage, wherein the second percentage is a percentage of number of resources in the second resource set out of the number $M_{total}$;

skip updating of the second resource set in response to the second percentage being not smaller than the β%; and increase an RSRP threshold in response to the second percentage being smaller than the B %; and repeat, according to the RSRP threshold increased, the first resource exclusion operation and the second resource exclusion operation on the first resource set to update the second resource set, until the second percentage is not smaller than the β%.

10. The terminal device of claim 5, wherein a resource pool configuration for the terminal device comprises a correspondence between values in the value set and priorities of data to be transmitted, wherein the resource pool configuration is configured by a network device or pre-configured.

11. A non-transitory computer-readable storage medium, being configured to store a computer program, which when executed by a processor of a terminal device causes the terminal device to:

obtain a first candidate resource set by performing a first resource exclusion operation on a first resource set in a resource selection window, the first resource set comprising available resources in a resource pool used by the terminal device in the resource selection window, and the first resource exclusion operation comprising:

performing resource exclusion according to a non-sensing slot in a resource sensing window, the non-sensing slot representing a slot in which the terminal device performs no sensing; and determine a second resource set on condition that a first percentage is smaller than X %, the first percentage being a percentage of number of resources in the first candidate resource set out of number $M_{total}$ of resources in the first resource set;

wherein the computer program, which when executed by the processor, further causes the terminal device to:

perform a target operation on a resource selected from the second resource set and selected for a to-be-transmitted data packet when the to-be-transmitted data packet does not satisfy a condition; or skip performing of the target operation on the resource selected from the second resource set and selected for the to-be-transmitted data packet when the to-be-transmitted data packet satisfies the condition;

wherein the target operation comprises at least a resource sensing operation.

12. The non-transitory computer-readable storage medium of claim 11, wherein the computer program executed by the terminal device to cause the terminal device to determine the second resource set further causes the terminal device to:

obtain a second candidate resource set by performing a second resource exclusion operation on the first resource set in the resource selection window, wherein the second resource exclusion operation comprises performing resource exclusion according to a physical sidelink control channel (PSCCH) sensed in the resource sensing window;

wherein the computer program is further executed by the processor to cause the terminal device to:

determine a second percentage, the second percentage being a percentage of number of resources in the second resource set out of the number $M_{total}$;

skip updating of the second resource set in response to the second percentage being not smaller than the X %; and increase a reference signal receiving power (RSRP) threshold in response to the second percentage being smaller than the X %; and repeat, according to the RSRP threshold increased, at least one of the first resource exclusion operation or the second resource exclusion operation on the first resource set to update the second resource set, until the second percentage is not smaller than the X %.

13. The non-transitory computer-readable storage medium of claim 12, wherein the computer program executed by the processor to cause the terminal device to repeat at least one of the first resource exclusion operation or the second resource exclusion operation on the first resource set further causes the terminal device to perform:

repeat the second resource exclusion operation on the first resource set; or repeat the first resource exclusion operation and the second resource exclusion operation on the first resource set, and abandoning a resource exclusion result of the first resource exclusion operation.

14. The non-transitory computer-readable storage medium of claim 12, wherein a resource pool configuration for the terminal device comprises a correspondence between values in the value set and priorities of data to be transmitted, wherein the resource pool configuration is configured by a network device or pre-configured.

15. The method of claim 1, wherein determining the second resource set comprises:

obtaining a second candidate resource set by performing a second resource exclusion operation on the first resource set in the resource selection window;

wherein the second resource exclusion operation comprises performing resource exclusion according to a physical sidelink control channel (PSCCH) sensed in the resource sensing window.

16. The method of claim 1, wherein skipping performing of the target operation on the resource selected from the second resource set and selected for the to-be-transmitted data packet when the to-be-transmitted data packet satisfies the condition comprises:

skipping performing of the resource sensing operation on whether the resource selected from the second resource set and selected for the to-be-transmitted data packet is preempted by other terminal devices, on condition that a priority of the to-be-transmitted data packet is a highest priority or higher than a priority threshold.

17. The method of claim 1, wherein the target operation further comprises a resource preemption determining operation and a resource exclusion operation, and skipping performing of the target operation on the resource selected from the second resource set and selected for the to-be-transmitted data packet when the to-be-transmitted data packet satisfies the condition comprises:

skipping performing of a resource preemption determining operation on the resource selected from the second resource set and selected for the to-be-transmitted data packet and skipping triggering of a resource exclusion operation on the resource selected from the second resource set and selected for the to-be-transmitted data packet, on condition that a priority of the to-be-transmitted data packet is a highest priority or higher than a priority threshold, wherein the resource preemption determining operation is an operation of determining whether the resource selected from the second resource set and selected for the to-be-transmitted data packet is preempted by other terminal devices.

18. The method of claim 1, wherein skipping performing of the target operation on the resource selected from the second resource set and selected for the to-be-transmitted data packet when the to-be-transmitted data packet satisfies the condition comprises:

skipping consecutive performing of a resource sensing operation on the resource selected from the second resource set and selected for the to-be-transmitted data packet after time slot r, on condition that a priority of the to-be-transmitted data packet is a highest priority or higher than a priority threshold, wherein the time slot r is a slot in which the terminal device completes resource indication by transmitting first sidelink control information.

19. The method of claim 1, wherein the target operation further comprises a resource preemption determining operation and a resource exclusion operation, and skipping performing of the target operation on the resource selected from the second resource set and selected for the to-be-transmitted data packet when the to-be-transmitted data packet satisfies the condition comprises:

skipping, after time slot r, performing of a resource preemption determining operation on the resource selected from the second resource set and selected for the to-be-transmitted data packet and skipping triggering of a resource exclusion operation on the resource selected from the second resource set and selected for the to-be-transmitted data packet, on condition that a priority of the to-be-transmitted data packet is a highest priority or higher than a priority threshold, wherein the resource preemption determining operation is an operation of determining whether the resource selected from the second resource set and selected for the to-be-transmitted data packet is preempted by other terminal devices, and the time slot r is a slot in which the terminal device completes resource indication by transmitting first sidelink control information.

20. The method of claim 1, wherein on condition that a trigger cause of the first resource exclusion operation is that the terminal device determines whether a selected resource is preempted by other terminal devices, a value of a parameter j used by the terminal device to determine a to-be-used resource R (x, y+j*Ptxlg) is 0, wherein R (x, y) represents any resource in the first resource set, j=0, 1, 2, 3 . . . , C−1, C is determined by a random counter value generated by the terminal device, Ptxlg represents a number of logical time slots converted from Ptx, and Ptx represents a resource reservation period determined by the terminal device, wherein the resource reservation period is one of values in a resource reservation period set in resource pool configuration used by the terminal device.

\* \* \* \* \*